US011805721B2

(12) United States Patent
Sporrer et al.

(10) Patent No.: US 11,805,721 B2
(45) Date of Patent: Nov. 7, 2023

(54) WORK MACHINE CONTROL SYSTEMS TO MONITOR GROUND ENGAGEMENT TOOLS AND MAP OBSTACLES

(71) Applicant: DEERE & COMPANY, Moline, IL (US)

(72) Inventors: Adam D. Sporrer, Huxley, IA (US); Ricky B. Theilen, Bettendorf, IA (US); Jeremy D. Krantz, Polk City, IA (US); Lucas B. Larsen, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 526 days.

(21) Appl. No.: 16/918,078

(22) Filed: Jul. 1, 2020

(65) Prior Publication Data
US 2021/0134090 A1     May 6, 2021

Related U.S. Application Data

(60) Provisional application No. 62/928,501, filed on Oct. 31, 2019.

(51) Int. Cl.
*A01B 79/00* (2006.01)
*A01B 63/00* (2006.01)
*A01B 76/00* (2006.01)
*B60Q 9/00* (2006.01)
*G07C 5/08* (2006.01)

(52) U.S. Cl.
CPC .......... *A01B 79/005* (2013.01); *A01B 63/008* (2013.01); *A01B 76/00* (2013.01); *A01B 79/00* (2013.01); *B60Q 9/00* (2013.01); *G07C 5/0841* (2013.01)

(58) Field of Classification Search
CPC ..... G07C 5/0841; A01B 63/008; A01B 76/00; A01B 79/00; A01B 79/005; B60Q 9/00
See application file for complete search history.

(56) References Cited

U.S. PATENT DOCUMENTS 6,041,582 A   3/2000  Tiede et al.
6,647,799 B1  11/2003 Raper et al.
(Continued)

FOREIGN PATENT DOCUMENTS

EP   3135086 A1   3/2017
EP   3729931 A1   10/2020

OTHER PUBLICATIONS

Extended European Search Report and Written Opinion issued in European Patent Application No. 20200334.9, dated Mar. 22, 2021, in 10 pages.

*Primary Examiner* — Thomas B Will
*Assistant Examiner* — Joel F. Mitchell
(74) *Attorney, Agent, or Firm* — Taft Stettinius & Hollister LLP; Stephen F. Rost

(57) ABSTRACT

Work machines, control systems for work machines, and methods of operating work machines are disclosed. A work machine includes a frame structure, a work implement, and a control system. The work implement is coupled to the frame structure and includes at least one ground engagement tool that is configured for movement in response to interaction with an underlying surface in use of the use work machine. The control system is coupled to the frame structure and includes a sensor mounted to the at least one ground engagement tool and a controller communicatively coupled to the sensor.

15 Claims, 13 Drawing Sheets

(56) References Cited

U.S. PATENT DOCUMENTS

| | | | |
|---|---|---|---|
| 6,666,279 B2* | 12/2003 | Scarlett et al. | A01B 63/111 |
| | | | 701/50 |
| 6,834,550 B2 | 12/2004 | Upadhyaya et al. | |
| 10,015,923 B2* | 7/2018 | Gschwendtner et al. | ............ |
| | | | A01B 63/008 |
| 2017/0196160 A1 | 7/2017 | Bjerketvedt et al. | |
| 2018/0310465 A1 | 11/2018 | Peterson et al. | |
| 2018/0310466 A1* | 11/2018 | Kovach et al. | G01D 5/12 |
| 2019/0116716 A1* | 4/2019 | Henry | A01B 21/08 |
| 2019/0235529 A1* | 8/2019 | Barrick et al. | A01B 63/14 |
| 2019/0246548 A1 | 8/2019 | Kovach et al. | |
| 2019/0320574 A1 | 10/2019 | Andrejuk et al. | |
| 2020/0107490 A1* | 4/2020 | Zemenchik | A01B 63/111 |
| 2021/0123219 A1* | 4/2021 | Foster et al. | E02F 9/2041 |

* cited by examiner

WORK MACHINE CONTROL SYSTEMS TO MONITOR GROUND ENGAGEMENT TOOLS AND MAP OBSTACLES

CROSS-REFERENCE TO RELATED APPLICATION(S)

This application claims priority to, and the benefit of, U.S. Provisional Patent Application Ser. No. 62/928,501 entitled "Work Machine Control Systems to Monitor Ground Engagement Tools and Map Obstacles," which was filed on Oct. 31, 2019. That application is incorporated by reference herein in its entirety.

FIELD OF THE DISCLOSURE

The present disclosure relates, generally, to control systems for work machines such as agricultural machines, and, more specifically, to control systems for tillage equipment.

BACKGROUND

Agricultural machines (e.g., tillage equipment) typically include ground engagement tools or shanks configured to penetrate the ground in use thereof. The performance of ground engagement tools may be reduced, or otherwise impacted by, obstacles (e.g., rocks, washouts) that are present in a particular field. Accordingly, devices and/or systems to detect obstacles, as well as devices and/or systems to monitor performance of ground engagement tools, remain areas of interest.

SUMMARY

The present disclosure may comprise one or more of the following features and combinations thereof.

According to one aspect of the present disclosure, a work machine may include a frame structure, a work implement, and a control system. The work implement may be coupled to the frame structure, and the work implement may include at least one ground engagement tool configured for movement in response to interaction with an underlying surface in use of the work machine. The control system may be coupled to the frame structure, and the control system may include a sensor mounted to the at least one ground engagement tool and a controller communicatively coupled to the sensor. The sensor may be configured to provide sensor input, and the controller may include memory having instructions stored therein that are executable by a processor to cause the processor to receive the sensor input from the sensor and to determine that the at least one ground engagement tool is in contact with the ground in response to receipt of sensor input provided by the sensor that is indicative of a characteristic of movement of the at least one ground engagement tool in use of the work machine.

In some embodiments, the instructions stored in the memory may be executable by the processor to cause the processor to obtain performance history data for the at least one ground engagement tool indicative of characteristics of movement of the at least one ground engagement tool in one or more previous operational states and to analyze movement of the at least one ground engagement tool in a current operational state based on the sensor input and the performance history data. The instructions stored in the memory may be executable by the processor to cause the processor to determine whether, based on the sensor input and the performance history data, movement of the at least one ground engagement tool in the current operational state is outside of, or inconsistent with, movement of the at least one ground engagement tool in the one or more previous operational states. Additionally, in some embodiments, the instructions stored in the memory may be executable by the processor to cause the processor to receive one or more external environment settings input by a user, to compare the sensor input provided by the sensor to one or more reference signals associated with the one or more external environment settings, and to determine whether the sensor input is consistent with, or meets, the one or more reference signals to evaluate performance of the working implement in certain operational states.

In some embodiments, the work implement may include a plurality of ground engagement tools each configured for movement in response to interaction with an underlying surface in use of the work machine, the control system may include a plurality of sensors each mounted to a corresponding one of the plurality of ground engagement tools, each communicatively coupled to the controller, and each configured to provide sensor input indicative of a characteristic of movement of the corresponding ground engagement tool in use of the work machine, and the instructions stored in the memory may be executable by the processor to cause the processor to receive the sensor input from the plurality of sensors, to detect movement of each of the plurality of ground engagement tools based on the sensor input, and to analyze movements of the plurality of ground engagement tools relative to one another in response to detection of movement of each of the plurality of ground engagement tools to evaluate performance uniformity of the work implement. The instructions stored in the memory may be executable by the processor to cause the processor to determine whether movements of the plurality of ground engagement tools relative to one another fall within one or more reference tolerances and to prompt a user to perform one or more adjustments to the work implement via the control system in response to a determination that the movements of the plurality of ground engagement tools relative to one another fall outside the one or more reference tolerances. Additionally, in some embodiments, the instructions stored in the memory may be executable by the processor to cause the processor to obtain performance history data for each of the plurality of ground engagement tools that is indicative of characteristics of movement for the corresponding ground engagement tool in one or more previous operational states and to analyze movement of each of the plurality of ground engagement tools in a current operational state based on the sensor input and the performance history data. The instructions stored in the memory may be executable by the processor to cause the processor to determine whether movement of each of the plurality of ground engagement tools in the current operational state is outside of, or inconsistent with, movement of the corresponding ground engagement tool in the one or more previous operational states.

In some embodiments, the work implement may include a plurality of ground engagement tools each configured for movement in response to interaction with an underlying surface in use of the work machine, the control system may include a plurality of movement sensors each mounted to a corresponding one of the plurality of ground engagement tools, each communicatively coupled to the controller, and each configured to provide sensor input indicative of a characteristic of movement of the corresponding ground engagement tool in use of the work machine, the control system may include at least one load sensor communicatively coupled to the controller and configured to provide sensor input indicative of a tow load associated with the work implement in use of the work machine, and the instructions stored in the memory may be executable by the processor to cause the processor to receive the sensor input from the plurality of movement sensors and the at least one load sensor, to receive one or more external environment settings input by a user, and to calculate at least one ratio of the tow load associated with the work implement to the position of at least one ground engagement tool relative to the underlying surface based at least partially on the sensor input from the plurality of movement sensors and the at least one load sensor and on the one or more external environment settings. The instructions stored in the memory may be executable by the processor to cause the processor to determine whether the calculated at least one ratio increases as the at least one ground engagement tool extends farther into the ground and to notify a user that one or more of the plurality of ground engagement tools are located in one or more compaction layers of the ground in response to a determination that the at least one ratio increases as the at least one ground engagement tool extends farther into the ground. Additionally, in some embodiments, the instructions stored in the memory may be executable by the processor to cause the processor to determine whether the calculated at least one ratio decreases as the at least one ground engagement tool extends farther into the ground and to notify a user that one or more of the plurality of ground engagement tools are located beneath one or more compaction layers of the ground in response to a determination that the at least one ratio decreases as the at least one ground engagement tool extends farther into the ground.

According to another aspect of the present disclosure, a control system may be mounted on a work machine that includes a frame structure and a work implement coupled to the frame structure that has a plurality of ground engagement tools each configured for movement in response to interaction with an underlying surface in use of the work machine. The control system may include a plurality of sensors and a controller. The plurality of sensors may each be mounted on a corresponding one of the plurality of ground engagement tools and configured to provide sensor input. The controller may be communicatively coupled to each of the plurality of sensors, and the controller may include memory having instructions stored therein that are executable by a processor to cause the processor to receive the sensor input from the plurality of sensors and to determine that the plurality of ground engagement tools are in contact with the ground in response to receipt of sensor input provided by the plurality of sensors that is indicative of characteristics of movement of the plurality of ground engagement tools in use of the work machine.

In some embodiments, the instructions stored in the memory may be executable by the processor to cause the processor to receive the sensor input from the plurality of sensors, to detect movement of each of the plurality of ground engagement tools based on the sensor input, and to analyze movements of the plurality of ground engagement tools relative to one another in response to detection of movement of each of the plurality of ground engagement tools to evaluate performance uniformity of the work implement. The instructions stored in the memory may be executable by the processor to cause the processor to obtain performance history data for each of the plurality of ground engagement tools that is indicative of characteristics of movement for the corresponding ground engagement tool in one or more previous operational states and to analyze movement of each of the plurality of ground engagement tools in a current operational state based on the sensor input and the performance history data.

In some embodiments, the instructions stored in the memory may be executable by the processor to cause the processor to receive one or more external environment settings input by a user, to compare the sensor input provided by the plurality of sensors to one or more reference signals associated with the one or more external environment settings, and to determine whether the sensor input is consistent with, or meets, the one or more reference signals to evaluate performance of the working implement in certain operational states. Additionally, in some embodiments, the control system may include at least one load sensor communicatively coupled to the controller and configured to provide sensor input indicative of a tow load associated with the work implement in use of the work machine, the plurality of sensors may include a plurality of movement sensors each configured to provide sensor input indicative of a characteristic of movement of a corresponding ground engagement tool in use of the work machine, and the instructions stored in the memory may be executable by the processor to cause the processor to receive the sensor input from the plurality of movement sensors and the at least one load sensor, to receive one or more external environment settings input by a user, and to calculate at least one ratio of the tow load associated with the work implement to the position of at least one ground engagement tool relative to the underlying surface based at least partially on the sensor input from the plurality of movement sensors and the at least one load sensor and on the one or more external environment settings.

According to yet another aspect of the present disclosure, a method of operating a work machine that includes a frame structure and a work implement coupled to the frame structure that has a plurality of ground engagement tools each configured for movement in response to interaction with an underlying surface in use of the work machine may include receiving, by a controller of the work machine, sensor input provided by a plurality of sensors each mounted on a corresponding one of the plurality of ground engagement tools, and determining, by the controller, that the plurality of ground engagement tools are in contact with the ground in response to receipt of sensor input provided by the plurality of sensors that is indicative of characteristics of movement of the plurality of ground engagement tools in use of the work machine.

In some embodiments, the method may include detecting, by the controller, movement of each of the plurality of ground engagement tools based on the sensor input, analyzing, by the controller, movements of the plurality of ground engagement tools relative to one another in response to detection of movement of each of the plurality of ground engagement tools to evaluate performance uniformity of the work implement, obtaining, by the controller, performance history data for each of the plurality of ground engagement tools that is indicative of characteristics of movement for the corresponding ground engagement tool in one or more previous operational states, and analyzing, by the controller, movement of each of the plurality of ground engagement tools in a current operational state based on the sensor input and the performance history data. Additionally, in some embodiments, the method may include receiving, by the controller, one or more external environment settings input by a user, comparing, by the controller, the sensor input provided by the plurality of sensors to one or more reference signals associated with the one or more external environment settings, and determining, by the controller, whether the sensor input is consistent with, or meets, the one or more reference signals to evaluate performance of the working implement in certain operational states.

In some embodiments, the method may include receiving, by the controller, sensor input provided by each of a plurality of movement sensors that is indicative of a characteristic of movement of a corresponding ground engagement tool in use of the work machine, receiving, by the controller, sensor input provided by at least one load sensor that is indicative of a tow load associated with the work implement in use of the work machine, receiving, by the controller, one or more external environment settings input by a user, and calculating, by the controller, at least one ratio of the tow load associated with the work implement to the position of at least one ground engagement tool relative to the underlying surface based at least partially on the sensor input from the plurality of movement sensors and the at least one load sensor and on the one or more external environment settings.

According to yet another aspect still of the present disclosure, a work machine may include a frame structure, a work implement, and a control system. The work implement may be coupled to the frame structure and include a plurality of ground engagement tools each configured for movement in response to interaction with an underlying surface in use of the work machine. The control system may be coupled to the frame structure and include a plurality of sensors each mounted to a corresponding one of the ground engagement tools and a controller communicatively coupled to the plurality of sensors. Each of the plurality of sensors may be configured to provide sensor input indicative of a characteristic of movement of the corresponding ground engagement tool in use of the work machine. The controller may include memory having instructions stored therein that are executable by a processor to cause the processor to receive the sensor input from the plurality of sensors, to identify the presence of one or more obstacles based on the sensor input, and to selectively map, with the aid of a location system, a location of one or more obstacles in response to an identification that one or more obstacles are present to generate event data for a particular field.

In some embodiments, the instructions stored in the memory may be executable by the processor to cause the processor to determine, based on the sensor input, movement of the ground engagement tools in response to an identification that one or more obstacles are present, and to map the location of the one or more present obstacles in response to a determination of a lack of movement of at least one of the plurality of ground engagement tools. The instructions stored in the memory may be executable by the processor to cause the processor to compare the sensor input provided by the plurality of sensors to a reference event threshold in response to a determination of movement of all of the plurality of ground engagement tools. The instructions stored in the memory may be executable by the processor to cause the processor to map the location of the one or more present obstacles in response to a determination that the sensor input provided by the plurality of sensors is greater than the reference event threshold.

In some embodiments, the control system may include an obstacle detection system coupled to the frame structure and communicatively coupled to the controller, the obstacle detection system may be configured to provide detection input indicative of a presence or absence of one more obstacles in the particular field, and the instructions stored in the memory may be executable by the processor to cause the processor to receive the detection input provided by the obstacle detection system, to identify the presence of one or more obstacles based on the detection input and the sensor input, and to selectively map, with the aid of the location system and based on the detection input and the sensor input, a location of one or more obstacles in response to an identification that one or more obstacles are present to generate event data for the particular field. The obstacle detection system may include at least one of the following: a radar detection system, a LIDAR detection system, a camera-based detection system, or an ultrasonic detection system.

In some embodiments, the instructions stored in the memory may be executable by the processor to cause the processor to, in response to the identification that one or more obstacles are present, obtain event history data for the particular field that is indicative of obstacles previously present in the particular field. The instructions stored in the memory may be executable by the processor to cause the processor to determine whether a position of one or more obstacles associated with the detection input and the sensor input is proximate to a position of one or more obstacles associated with the event history data. The instructions stored in the memory may be executable by the processor to cause the processor to map a location of the one or more obstacles in response to a determination that the position of the one or more obstacles associated with the detection input and the sensor input is not proximate to the position of the one or more obstacles associated with the event history data. Additionally, in some embodiments, the instructions stored in the memory may be executable by the processor to cause the processor to establish a trend for the particular field based on the position of the one or more obstacles associated with the detection input and the sensor input and the position of the one or more obstacles associated with the event history data in response to a determination that the position of the one or more obstacles associated with the detection input and the sensor input is proximate to the position of the one or more obstacles associated with the event history data.

According to a further aspect of the present disclosure, a control system may be mounted on a work machine that includes a frame structure and a work implement coupled to the frame structure that has a plurality of ground engagement tools each configured for movement in response to interaction with an underlying surface in use of the work machine. The control system may include an obstacle detection system and a controller. The obstacle detection system may be coupled to the frame structure and configured to provide detection input indicative of a presence or absence of one more obstacles in a particular field. The controller may be communicatively coupled to the obstacle detection system. The controller may include memory having instructions stored therein that are executable by a processor to cause the processor to receive the detection input provided by the obstacle detection system, to identify the presence of one or more obstacles based on the detection input, and to selectively map, with the aid of the location system and based on the detection input, a location of one or more obstacles in response to an identification that one or more obstacles are present to generate event data for the particular field.

In some embodiments, the control system may include a plurality of sensors each mounted to a corresponding one of the ground engagement tools and communicatively coupled to the controller, each of the plurality of sensors may be configured to provide sensor input indicative of a characteristic of movement of the corresponding ground engagement tool in use of the work machine, and the instructions stored in the memory may be executable by the processor to cause the processor to receive the sensor input provided by the plurality of sensors, to identify the presence of one or more obstacles based on the detection input and the sensor input, and to selectively map, with the aid of the location system and based on the detection input and the sensor input, a location of one or more obstacles in response to the identification that one or more obstacles are present to generate event data for the particular field. The instructions stored in the memory may be executable by the processor to cause the processor to determine, based on the sensor input and the detection input, movement of the ground engagement tools in response to the identification that one or more obstacles are present, and to map the location of the one or more present obstacles in response to a determination of a lack of movement of at least one of the plurality of ground engagement tools. Additionally, in some embodiments, the instructions stored in the memory may be executable by the processor to cause the processor to compare the sensor input and the detection input to a reference event threshold in response to a determination of movement of all of the plurality of ground engagement tools, and wherein the instructions stored in the memory are executable by the processor to cause the processor to map the location of the one or more present obstacles in response to a determination that the sensor input and the detection input is greater than the reference event threshold.

In some embodiments, the instructions stored in the memory may be executable by the processor to cause the processor to, in response to the identification that one or more obstacles are present, obtain event history data for the particular field that is indicative of obstacles previously present in the particular field, and to determine whether a position of one or more obstacles associated with the detection input and the sensor input is proximate to a position of one or more obstacles associated with the event history data. The instructions stored in the memory may be executable by the processor to cause the processor to map a location of the one or more obstacles in response to a determination that the position of the one or more obstacles associated with the detection input and the sensor input is not proximate to the position of the one or more obstacles associated with the event history data.

According to a further aspect of the present disclosure still, a method of operating a work machine that includes a frame structure and a work implement coupled to the frame structure that has a plurality of ground engagement tools each configured for movement in response to interaction with an underlying surface in use of the work machine may include receiving, by a controller of the work machine, sensor input provided by a plurality of sensors each mounted on a corresponding one of the plurality of ground engagement tools that is indicative of a characteristic of movement of the corresponding ground engagement tool in use of the work machine, receiving, by the controller, detection input provided by an obstacle detection system coupled to the frame structure that is indicative of a presence or absence of one or more obstacles in a particular field, identifying, by the controller, the presence of one or more obstacles in the field based on the sensor input and the detection input, and selectively mapping, by the controller and with the aid of a location system, a location of one or more obstacles based on the sensor input and the detection input in response to an identification that one or more obstacles are present to generate event data for the particular field.

In some embodiments, the method may include determining, by the controller and based on the sensor input and the detection input, movement of the ground engagement tools in response to the identification that one or more obstacles are present, and selectively mapping the location of the one or more obstacles may include mapping the location of the one or more present obstacles in response to a determination of a lack of movement of at least one of the plurality of ground engagement tools. Additionally, in some embodiments, the method may include obtaining, by the controller in response to the identification that one or more obstacles are present, event history data for the particular field that is indicative of obstacles previously present in the particular field, and determining, by the controller, whether a position of one or more obstacles associated with the detection input and the sensor input is proximate to a position of one or more obstacles associated with the event history data. Selectively mapping the location of the one or more obstacles may include mapping the location of the one or more obstacles in response to a determination that the position of the one or more obstacles associated with the detection input and the sensor input is not proximate to the position of the one or more obstacles associated with the event history data.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
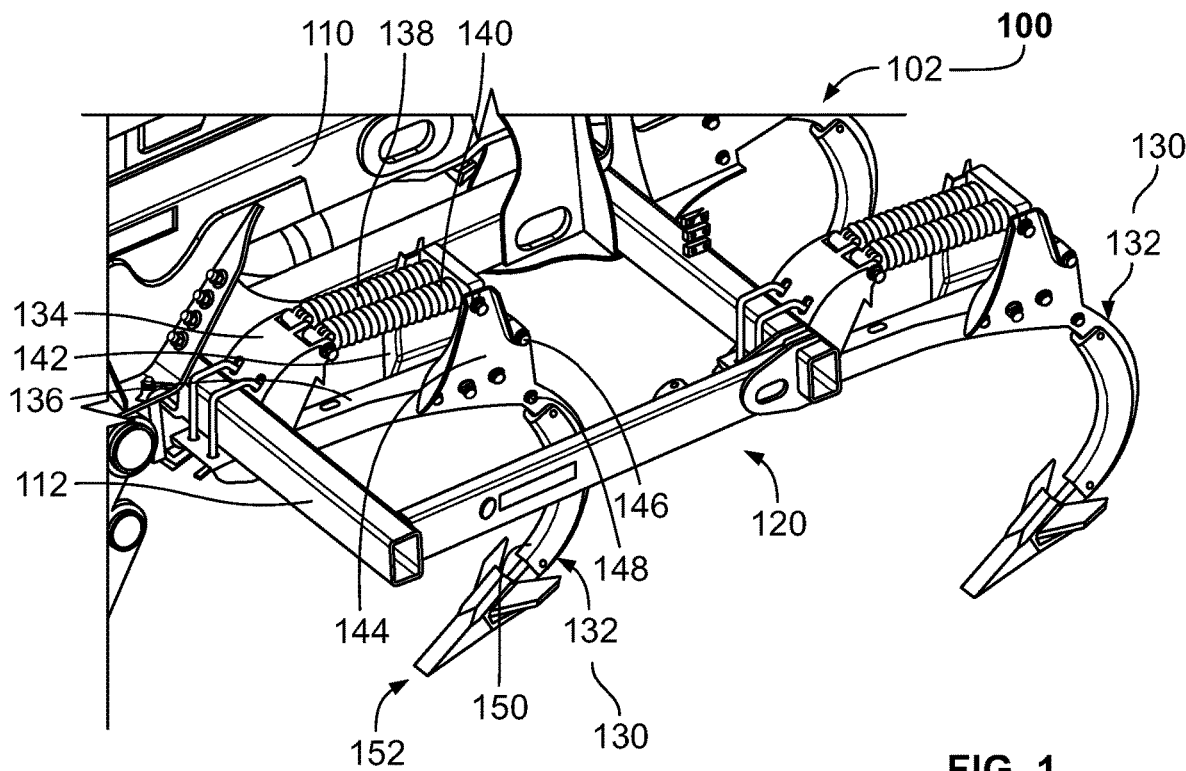
FIG. 1 is a perspective view of a work implement of a work machine with a ground engagement tool thereof depicted in a normal operating position.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an illustrative work machine 100 is embodied as, or otherwise includes, an agricultural implement 102 that is configured for interaction with an underlying surface (i.e., the ground) in use thereof. It should be appreciated that the implement 102 is configured for attachment to a hitch, drawbar, or other suitable implement attachment interface of an agricultural vehicle such as a tractor 400 (see FIG. 4), for example. The tractor 400 is therefore configured to tow, pull, or otherwise drive movement of the implement 102 in use of the implement 102.

In the illustrative embodiment, the agricultural implement 102 is embodied as, or otherwise includes, tillage equipment. In some embodiments, the illustrative implement 102 may be embodied as, or otherwise include, any one of a number of tillage devices manufactured by John Deere. For example, the implement 102 may be embodied as, or otherwise include, any one of the following: a series 22B Ripper, a series 2720 Disk Ripper, a series 2730 Combination Ripper, a series 2100 Minimum-Till, a series 913 V-Ripper, a series 915 V-Ripper, a SR1201 Frontier™ Shank Ripper, a SR1202 Frontier™ Shank Ripper, and a SR1203 Frontier™ Shank Ripper. Of course, in other embodiments, it should be appreciated that the agricultural implement 102 may be embodied as, or otherwise include, any other suitable tillage device.

The illustrative agricultural implement 102 is adapted for use in one or more tillage applications. However, in some embodiments, the implement 102 may be adapted for use in other applications. For example, in some embodiments, the implement 102 may be embodied as, included in, or otherwise adapted for use with, equipment used in lawn and garden, construction, landscaping and ground care, golf and sports turf, forestry, engine and drivetrain, or government and military applications. In such embodiments, the implement 102 of the present disclosure may be included in, or otherwise adapted for use with, tractors, front end loaders, scraper systems, cutters and shredders, hay and forage equipment, planting equipment, seeding equipment, sprayers and applicators, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative agricultural implement 102 includes a frame structure 110 and a work implement 120 coupled to the frame structure 110. The frame structure 110 may include, or otherwise be embodied as, a main frame or main chassis of the implement 102. The work implement 120 is embodied as, or otherwise includes, a collection of structures that are configured for interaction with the ground to till or cultivate an agricultural field.

In the illustrative embodiment, the work implement 120 includes ground engagement tools 130, each of which is configured for movement in response to interaction with an underlying surface (i.e., the ground) in use of the work machine 100 as further discussed below. Each of the illustrative ground engagement tools 130 is embodied as, or otherwise includes, a shank assembly 132. However, in other embodiments, it should be appreciated that each of the ground engagement tools 130 may be embodied as, or otherwise include, another suitable ground engagement device, such as a blade, a disk, a roller, a sweep, a tine, a chisel, or a plow, for example.

Figure 2:
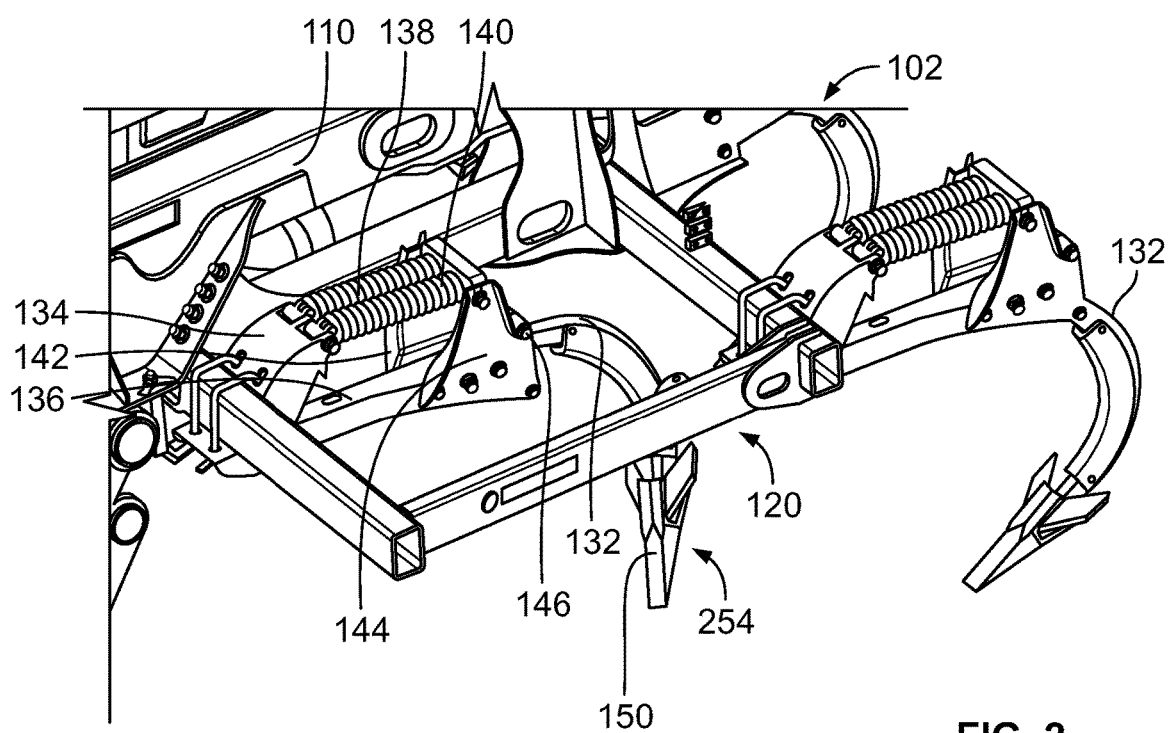
FIG. 2 is a perspective view of the work implement of FIG. 1 with the ground engagement tool thereof depicted in a tripped position.
Figure 3:
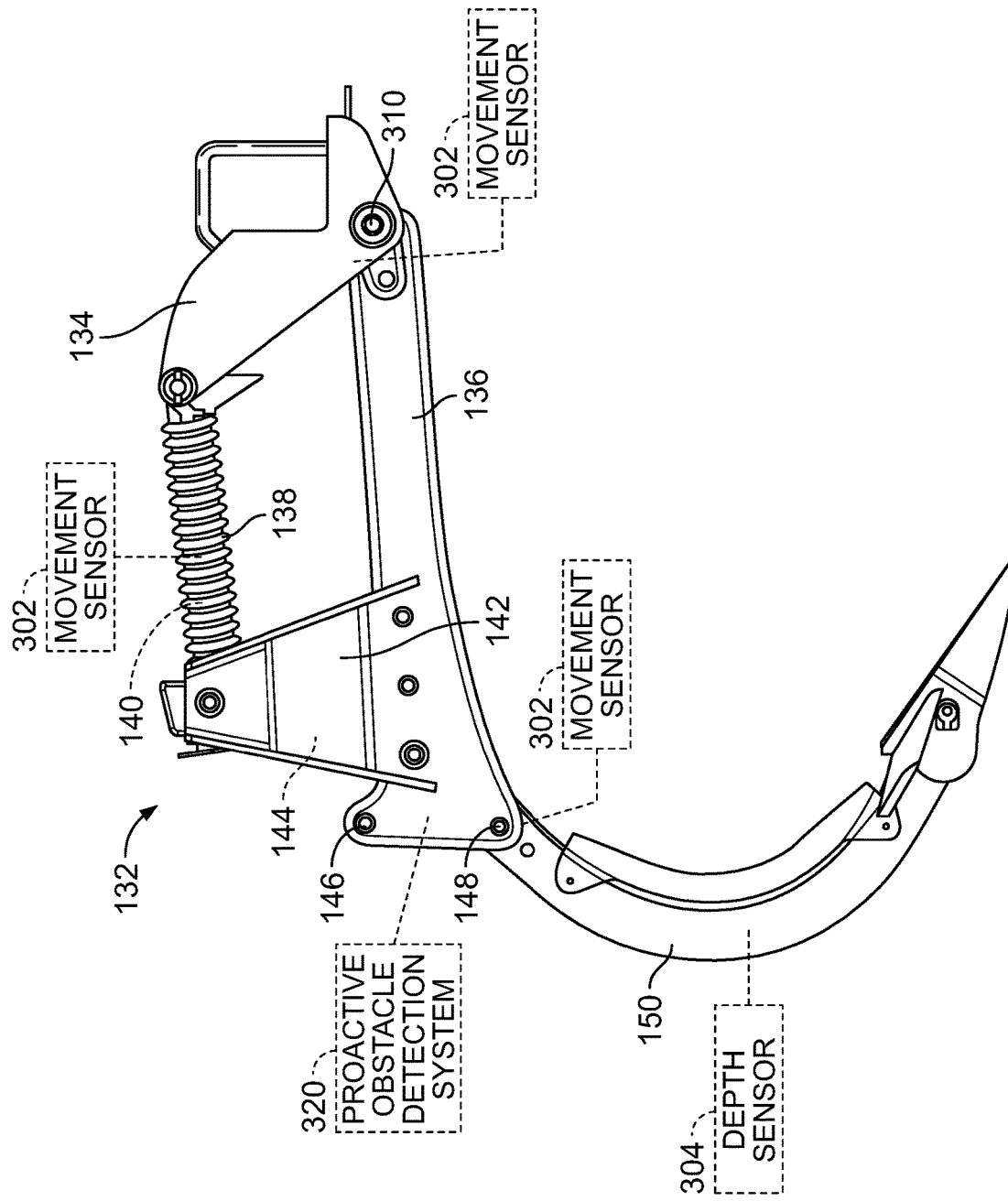
FIG. 3 is a side elevation view of a ground engagement tool of the work implement of FIG. 1 with one or more movement sensors and/or at least one obstacle detection system coupled thereto.

As best seen in FIGS. 1-3, each shank assembly 132 illustratively includes a retention assembly 134, a base bar 136, biasing elements 138, 140, plates 142, 144, a pivot pin 146, a shear pin 148, and a shank member 150. The retention assembly 134 is embodied as, or otherwise includes, a number of components cooperatively configured to receive a mounting bar 112 included in, or otherwise coupled to, the frame structure 110 to retain the shank assembly 132 during operation. The base bar 136 is pivotally coupled to the retention assembly 134 (i.e., to at least one component thereof) and positioned between, and in contact with, the plates 142, 144. The biasing elements 138, 140 extend between, and are coupled to, the retention assembly 134 and the plates 142, 144 such that the biasing elements 138, 140 are vertically spaced from the base bar 136. The shank member 150 is pivotally coupled to the plates 142, 144 by the pivot pin 146. Pivotal movement of the shank member 150 relative to the plates 142, 144 is substantially limited by the shear pin 148, which at least partially secures the shank member 150 to the plates 142, 144.

When the shank member 150 of each shank assembly 132 contacts and/or penetrates the ground in use of the work machine 100, the shank member 150 may be exposed to underground obstacles, such as rocks, washouts, impediments, obstructions, etc. Contact with an obstacle of considerable size may cause the shear pin 148 to shear or fracture, thereby allowing the shank member 150 to pivot relative to the plates 142, 144 about the pivot pin 146 upwardly and away from the obstacle to minimize damage to the shank assembly 132. Thus, shearing or fracturing of the shear pin 148 provides a protective measure that results in, or is otherwise associated with, movement of the shank assembly 132 away from its normal ground-engaging position.

Referring now to FIGS. 1 and 2, one shank assembly 132 (i.e., the leftmost shank assembly 132) is illustratively depicted in a ripping position 152 (see FIG. 1) and a tripped position 254 (see FIG. 2). The ripping position 152 of the shank assembly 132 corresponds to, or is otherwise associated with, a normal operating position of the shank assembly 132 in which the shank member 150 penetrates the ground. In the ripping position 152 of the shank assembly 132, the shank member 150 is configured for some degree of movement (e.g., movement with the plates 142, 144 relative to the retention assembly 134 that is facilitated by the biasing elements 138, 140) when the shank member 150 penetrates the ground. However, as indicated above, such movement is limited by the intact shear pin 148. In response to shearing or fracturing of the shear pin 148, the shank member 150 pivots relative to the plates 142, 144 away from the ground to the tripped position 254.

Figure 6:
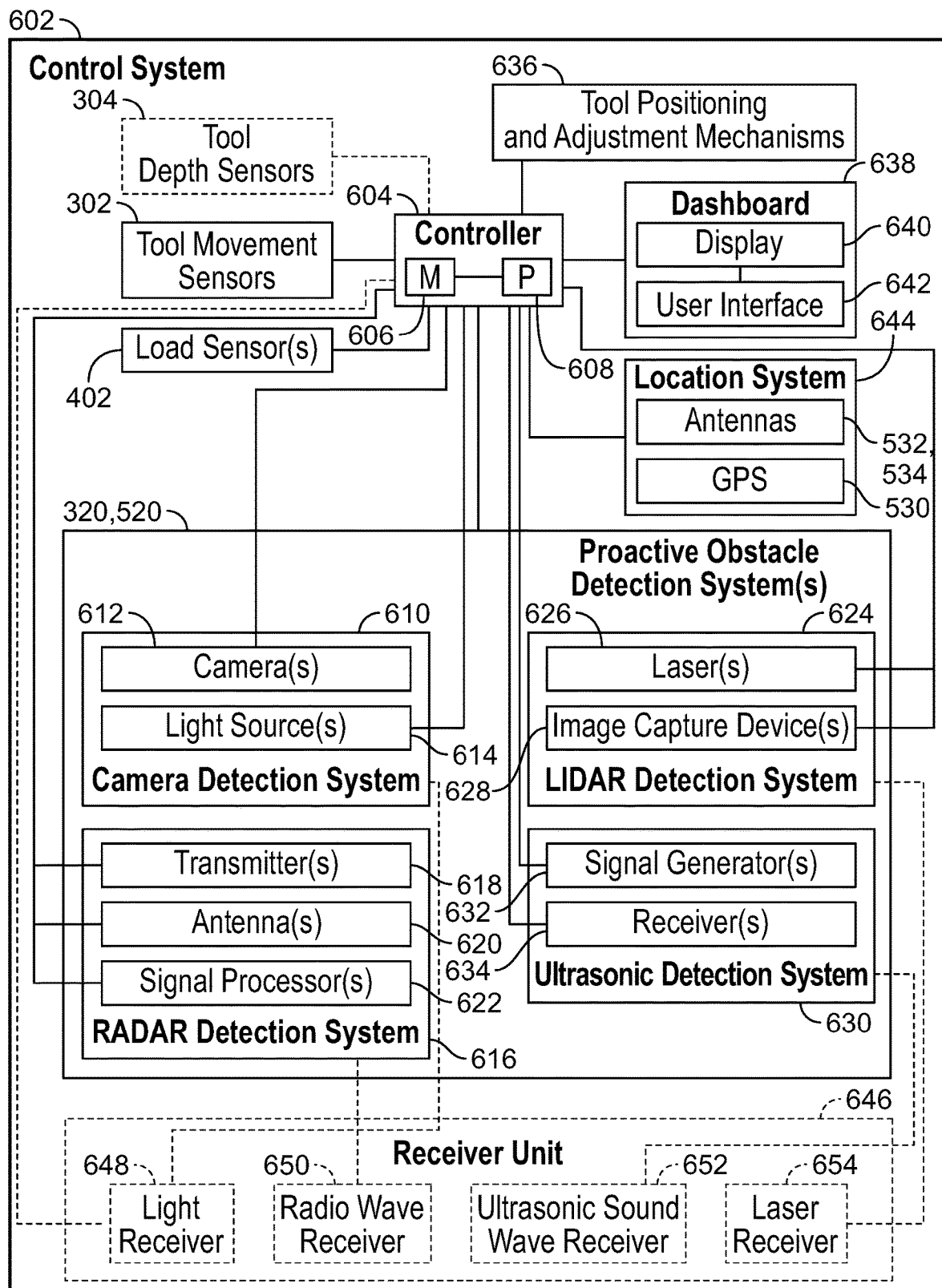
FIG. 6 is a diagrammatic view of a control system for the work machine that includes the work implement shown in FIG. 1.

To control operation of the agricultural implement 102, the work machine 100 illustratively includes a control system 602 (see FIG. 6). The control system 602 may be coupled to and mounted on the frame structure 110 of the agricultural implement 102 or on the tractor 400. As described in greater detail below, the control system 602 includes a movement sensor 302 (see FIG. 3) mounted to each shank assembly 132 that is configured to provide sensor input and a controller 604 communicatively coupled to the movement sensor 302. The controller 604 includes memory 606 having instructions stored therein that are executable by a processor 608 to cause the processor 608 to receive the sensor input from the movement sensor 302 and to determine that the corresponding shank assembly 132 is in contact with the ground in response to receipt of sensor input from the sensor 302 that is indicative of a characteristic of movement of the shank assembly 132 in use of the work machine 100.

Such control by the controller 604 facilitates monitoring and/or evaluation of the performance of each shank assembly 132 in use of the work machine 100, among other things. In the illustrative embodiment, when each shank assembly 132 is in the ripping position 152, the sensor input provided by each movement sensor 302 is indicative of a characteristic of movement of the corresponding shank assembly 132 that occurs during, corresponds to, or is otherwise associated with, normal operation of the work machine 100. It should be appreciated that the sensor input provided by each movement sensor 302 that occurs during normal operation of the work machine 100 may be characterized by, or otherwise associated with, sensor input below a reference threshold and/or within a reference tolerance. It should also be appreciated that a lack of sensor input from each movement sensor 302, sensor input from each movement sensor 302 that exceeds the reference threshold, and/or sensor output from each movement sensor 302 that lies outside of the reference tolerance may be indicative of a fault condition of the work machine 100, such as movement of one or more shank assemblies 132 to the tripped position(s) 254 in response to encountering one or more obstacles, for example.

Referring now to FIG. 3, in some embodiments, one movement sensor 302 included in the control system 602 may be mounted to each shank assembly 132 in close proximity to the shear pin 148. In such embodiments, sensor input provided by the sensor 302 may be used to detect movement of the shank member 150 and/or the presence of the shear pin 148 in use of the work machine 100. In other embodiments (i.e., as indicated by the depiction of those features in phantom), one movement sensor 302 may be mounted to each shank assembly 132 in another suitable location. In one example, the movement sensor 302 may be mounted in close proximity to the biasing elements 138, 140 to detect deflection of the elements 138, 140 in use of the work machine 100. In another example, the movement sensor 302 may be mounted in close proximity to a pivotal coupling 310 between the retention assembly 134 and the base bar 136 to detect movement of various components (e.g., the base bar 136 and/or the plates 142, 144 relative to the retention assembly 134) in use of the work machine 100. Of course, it should be appreciated that in other embodiments still, the movement sensor 302 may be mounted to each shank assembly 132 in another suitable location.

In the illustrative embodiment, each movement sensor 302 is embodied as, or otherwise includes, any device or collection of devices capable of sensing movement of the shank assembly 132 to which the movement sensor 302 is mounted. In some embodiments, each movement sensor 302 may be embodied as, or otherwise include, a linear potentiometer, a rotary potentiometer, an accelerometer, an inertial sensor or inertial measurement device, a Hall effect sensor, a proximity sensor, a capacitive transducer, or the like. Of course, in other embodiments, it should be appreciated that each movement sensor 302 may be embodied as, or otherwise include, another suitable device.

In some embodiments, a depth sensor 304 included in the control system 602 may be mounted to the shank member 150 of each shank assembly 132. Each depth sensor 304 may be illustratively embodied as, or otherwise include, any device or collection of devices capable of providing sensor input indicative of a characteristic of position of the shank assembly 132 to which the depth sensor 304 is mounted relative to the ground. In some embodiments, the sensor input provided by each depth sensor 304 may be indicative of a distance that the corresponding shank member 150 extends into the ground (i.e., a penetration depth of the shank member 150 into the ground). In some embodiments, each depth sensor 304 may be embodied as, or otherwise include, a linear potentiometer, a rotary potentiometer, an accelerometer, an inertial sensor or inertial measurement device, a Hall effect sensor, a proximity sensor, a capacitive transducer, or the like. Of course, in other embodiments, it should be appreciated that each depth sensor 304 may be embodied as, or otherwise include, another suitable device.

It should be appreciated that in some embodiments, the depth sensors 304 may be omitted from the control system 602 entirely. In such embodiments, a characteristic of position of the shank assembly 132 (e.g., a penetration depth or distance that the shank member 150 extends into the ground) may be determined based on sensor input provided by other sensor(s) included in the control system 602, such as the movement sensors 302, for example.

Figure 5:
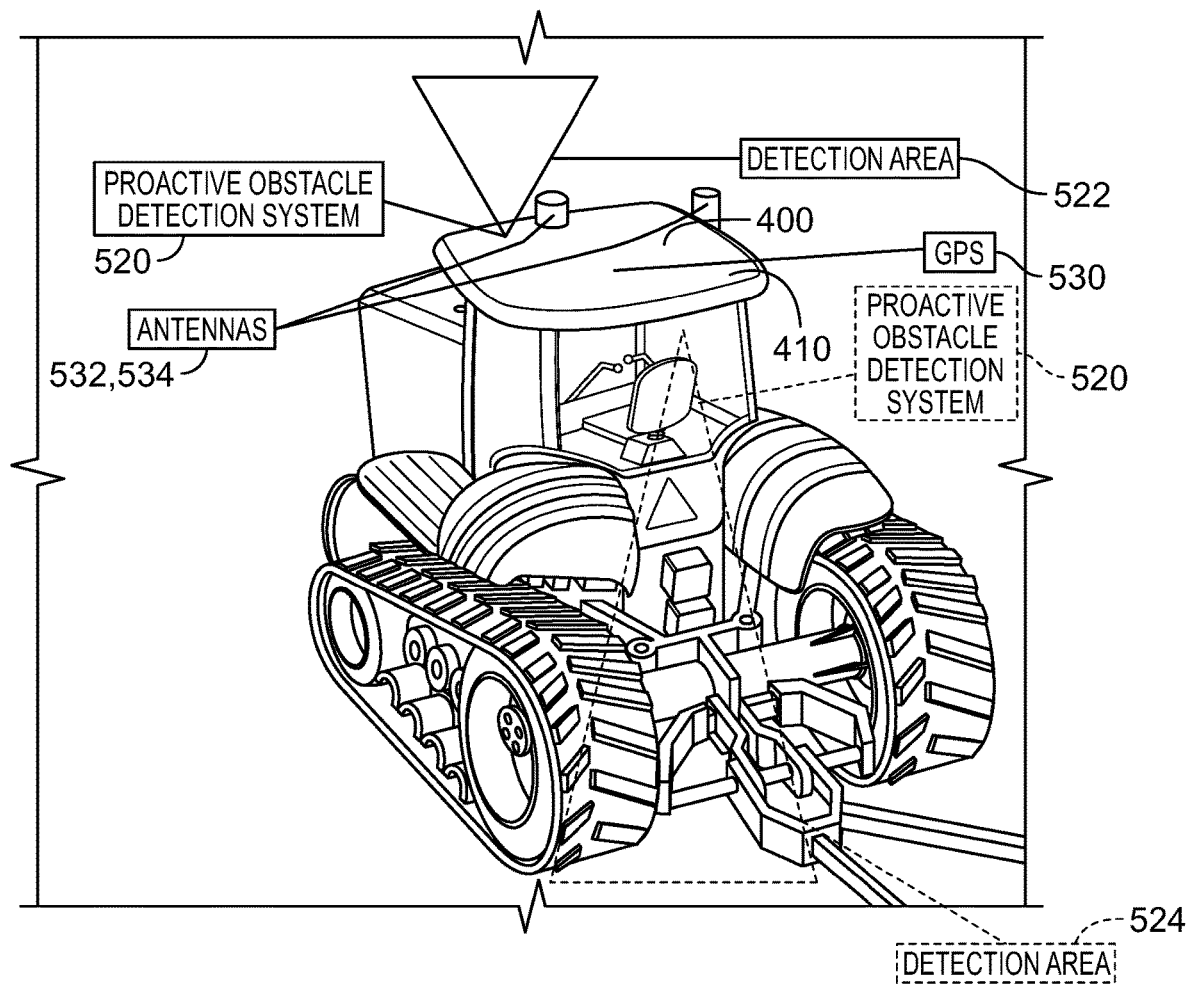
FIG. 5 is a perspective view of the agricultural vehicle shown in FIG. 4 having one or more obstacle detection systems coupled thereto.

In some embodiments, an obstacle detection system 320 included in the control system 602 may be coupled to the work machine 100 (i.e., as indicated by the depiction of that feature in phantom). The obstacle detection system 320, and similar systems described below with reference to FIGS. 5 and 6, is embodied as, or otherwise includes, any collection of devices capable of cooperatively providing detection input indicative of a presence or absence of one more obstacles in an agricultural field. The obstacle detection system 320 proactively detects the presence or absence of obstacles in a predetermined or reference detection area, which may be established based on the coupling location of the obstacle detection system 320 to the work machine 100. In embodiments in which one or more obstacle detection systems 320 are coupled to the work machine 100 and one movement sensor 302 is mounted to each shank assembly 132, the one or more detection systems 320 and the movement sensors 302 may provide, respectively, proactive and reactive devices for monitoring the performance of the shank assemblies 132 and identifying underground obstacles that may be encountered by the work machine 100 in use thereof.

Figure 4:
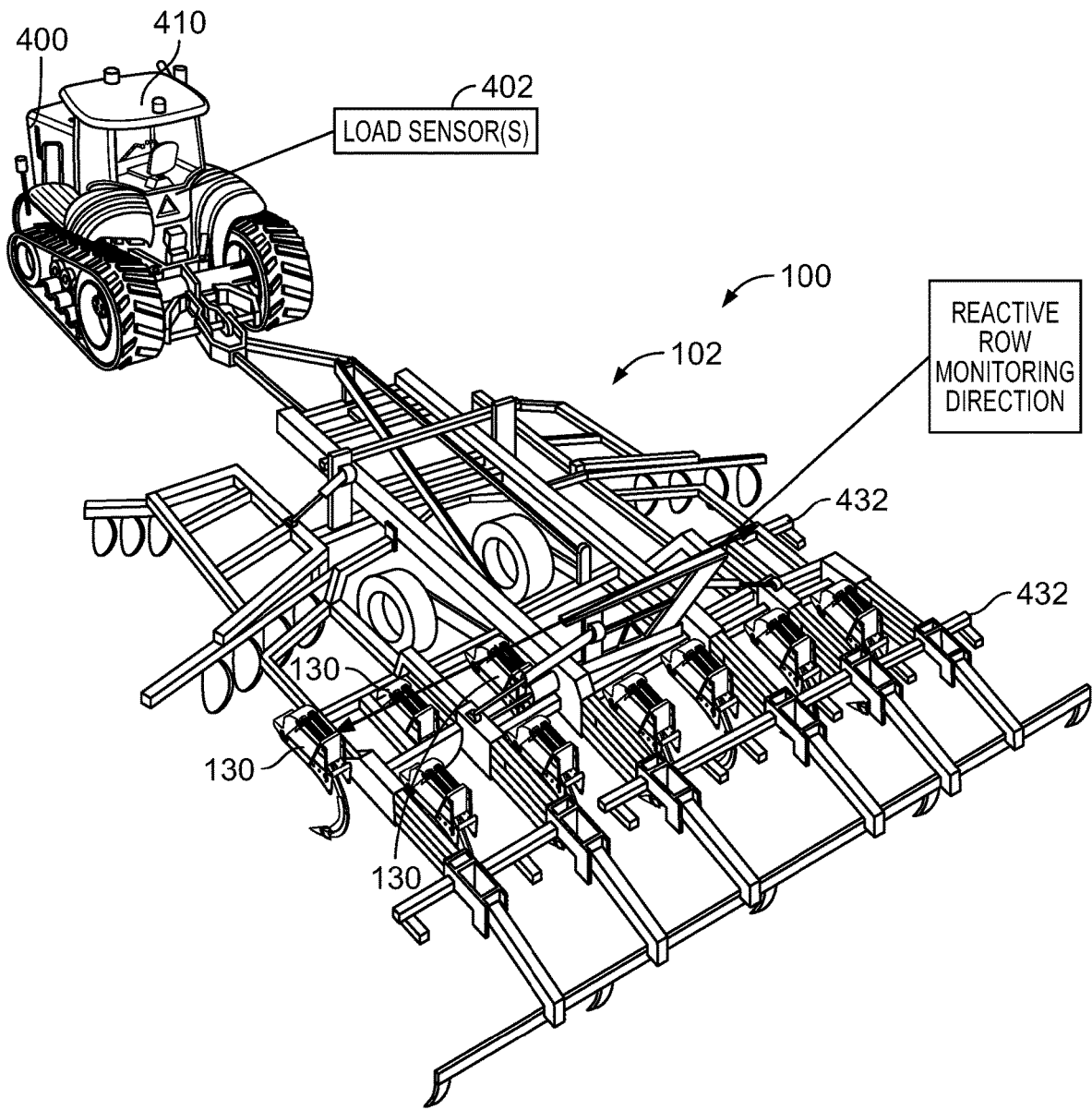
FIG. 4 is a perspective view of an agricultural vehicle coupled to the work implement of FIG. 1 that has one or more load sensors.

Referring now to FIG. 4, the work machine 100 is coupled to and towed by the tractor 400 in use thereof. The ground engagement tools 130 of the illustrative work machine 100 are arranged adjacent to one another in rows 432. To evaluate performance uniformity of the agricultural implement 102 across each of the rows 432, as described in greater detail below with reference to FIG. 8, the instructions stored in the memory 606 are executable by the processor 608 to cause the processor 608 to receive the sensor input provided by the movement sensors 302 coupled to the shank assemblies 132, to detect movement of each of the shank assemblies 132 based on the sensor input, and to analyze movements of the shank assemblies 132 relative to one another in response to detection of movement of each of the shank assemblies 132.

In some embodiments, one or more load sensors 402, which may be included in the control system 602 or provided externally from the control system 602, may be mounted to the tractor 400. Each load sensor 402 may be embodied as, or otherwise include, any device or collection of devices capable of providing tow load sensor input indicative of a tow load associated with the implement 102 when the vehicle 400 is used to tow the implement 102. In some embodiments, each load sensor 402 may be embodied as, or otherwise include, a load cell such as a strain gage load cell, a piezoelectric load cell, a hydraulic load cell, or a pneumatic load cell, for example. Of course, in other embodiments, it should be appreciated that each load sensor 402 may be embodied as, or otherwise include, another suitable load sensor. It should be appreciated that in some embodiments, the tow load sensor input provided by each of the sensor(s) 402 may be indicative of an actual load applied to a hitch of the tractor 400 by the implement 102. Additionally, it should be appreciated that in other embodiments, the tow load sensor input provided by each of the sensor(s) 402 may be indicative of a load applied to an engine of the tractor 400 by the implement 102, or of fuel consumed by the engine of the tractor 400 while towing the implement 102.

Referring now to FIG. 5, in some embodiments, rather than being mounted on or coupled to the work machine 100 (e.g., like the obstacle detection system 320), an obstacle detection system 520 may be mounted in one or more locations (i.e., as indicated by the depiction of one or more features in phantom) on the tractor 400. The obstacle detection system 520 may be substantially identical to the obstacle detection system 320. In one example, the obstacle detection system 520 may be mounted on an operator cab 410 of the vehicle 400 to facilitate proactive detection of the presence or absence of obstacles in a predetermined or reference detection area 522 that is located in front of the vehicle 400. In another example, the obstacle detection system 520 may be mounted on the operator cab 410 to facilitate proactive detection of the presence or absence of obstacles in a predetermined or reference detection area 524 that is located behind the vehicle 400. Of course, it should be appreciated that in other embodiments, the obstacle detection system 520 may be mounted on the vehicle 400 in another suitable location.

In the illustrative embodiment, the agricultural vehicle 400 has a Global Positioning System (GPS) 530 coupled thereto. It should be appreciated that the GPS 530 may be integrated with the electrical components of the control system 602 (e.g., as depicted in FIG. 6) or included as an accessory that may be added on to the vehicle 400. The GPS 530 is illustratively mounted on the operator cab 410. However, in other embodiments, it should be appreciated that the GPS 530 may be mounted in another suitable location, such as on another portion of the vehicle 400 or on the agricultural implement 102, for example.

The illustrative vehicle 400 has antennas 532, 534 coupled thereto and mounted on the operator cab 410. Of course, it should be appreciated that, in other embodiments, the antennas 532, 534 may be coupled to and mounted on another suitable portion of the vehicle 400 The antennas 532, 534 are communicatively coupled to the GPS 530 and adapted for use therewith. In some embodiments, rather than being externally coupled to the GPS 530, the antennas 532, 534 may be integrated with and/or included in the GPS 530. In any case, the antennas 532, 534 are configured to receive signals from satellites or the like so that the location of the antennas 532, 534 may be determined by the GPS 530. Put another way, the physical location of the antennas 532, 534 may be the basis for establishing the location identified by the GPS 530.

Referring now to FIG. 6, in the illustrative embodiment, the control system 602 includes the movement sensors 302, the one or more load sensor(s) 402, at least one proactive obstacle detection system 320, 520, tool positioning and adjustment mechanisms 636, a dashboard 638, and a location system 644. Each of the devices and/or systems 302, 304, 402, 320, 520, 636, 638, 644 is communicatively coupled to the controller 604. In some embodiments, the control system 602 may include a receiver unit 646 communicatively coupled to the controller 604. Additionally, in some embodiments as indicated above, the control system 602 may include the depth sensors 304.

The processor 608 of the illustrative controller 604 may be embodied as, or otherwise include, any type of processor, controller, or other compute circuit capable of performing various tasks such as compute functions and/or controlling the functions of the agricultural implement 102. For example, the processor 608 may be embodied as a single or multi-core processor(s), a microcontroller, or other processor or processing/controlling circuit. In some embodiments, the processor 608 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 608 may be embodied as, or otherwise include, a high-power processor, an accelerator co-processor, or a storage controller. In some embodiments still, the processor 608 may include more than one processor, controller, or compute circuit.

The memory device 606 of the illustrative controller 604 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 606 may be embodied as a block addressable memory, such as those based on NAND or NOR technologies. The memory device 606 may also include future generation nonvolatile devices, such as a three dimensional crosspoint memory device (e.g., Intel 3D XPoint™ memory), or other byte addressable write-in-place nonvolatile memory devices. In some embodiments, the memory device 606 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

In the illustrative embodiment, the control system 602 includes the obstacle detection system 320 and/or the obstacle detection system 520. Each of the illustrative systems 320, 520 may be embodied as, or otherwise include, any one of the following: a camera detection system 610, a radar detection system 616, a lidar detection system 624, and an ultrasonic detection system 630. Of course, it should be appreciated that in other embodiments, each of the illustrative systems 320, 520 may include one or more of the systems 610, 616, 624, 630. Furthermore, at least in some embodiments, it should be appreciated that the control system 602 may include either the movement sensors 302 or one of the obstacle detection systems 320, 520.

The illustrative camera detection system 610 is embodied as, or otherwise includes, any device or collection of devices capable of detecting and/or imaging obstacles in an agricultural field that may be encountered by the agricultural implement 102 in use thereof. The illustrative system 610 includes one or more camera(s) 612 and one or more light source(s) 614 communicatively coupled to the controller 604. Each camera 612 is configured to capture and/or store images of an agricultural field to locate and identify underground obstacles. In some embodiments, each camera 612 may be embodied as, or otherwise include, a digital camera, a panoramic camera, or the like, for example. Additionally, in some embodiments, each camera 612 may be included in, coupled to, or otherwise adapted for use with, a vision system. It should also be appreciated that each camera 612 has a viewable area associated therewith that may be illuminated with the aid of the one or more light source(s) 614. Each light source 614 may be embodied as, or otherwise include, any device capable of producing light to facilitate capture and/or identification of obstacles present in an agricultural field. It should be appreciated in some embodiments, the detection system 610 may include other suitable components in addition to, or as an alternative to, the aforementioned devices.

The illustrative radar detection system 616 is embodied as, or otherwise includes, any device or collection of devices capable of detecting and/or imaging, based on radio waves, obstacles in an agricultural field that may be encountered by the agricultural implement 102 in use thereof. The illustrative system 616 includes one or more transmitter(s) 618, one or more antenna(s) 620, and one or more signal processor(s) 622 communicatively coupled to the controller 604. Each transmitter 618 is embodied as, or otherwise includes, any device or collection of devices capable of emitting radio waves or radar signals in predetermined directions toward obstacles located in an agricultural field. Each antenna or receiver 620 is embodied as, or otherwise includes, any device or collection of devices capable of receiving radar signals emitted by the transmitter(s) 618 that are reflected and/or scattered by the obstacles. Each signal processor 622 is embodied as, or otherwise includes, any device or collection of devices (e.g., one or more processor(s)) capable of amplifying, processing, and/or conditioning radar signals received by the antenna(s) 620 to recover useful radar signals. It should be appreciated in some embodiments, the detection system 616 may include other suitable components in addition to, or as an alternative to, the aforementioned devices.

The illustrative lidar detection system 624 is embodied as, or otherwise includes, any device or collection of devices capable of detecting and/or imaging, using ultraviolet, visible, or near infrared light, obstacles in an agricultural field that may be encountered by the agricultural implement 102 in use thereof. The illustrative detection system 624 includes one or more laser(s) 626 and one or more image capture device(s) 628 communicatively coupled to the controller 604. Each laser 626 may be embodied as, or otherwise include, any device or collection of devices capable of emitting ultraviolet, visible, or near infrared light toward obstacles in an agricultural field. Each image capture device 628 may be embodied as, or otherwise include, any device or collection of devices capable of illuminating a viewable area in an agricultural field, sensing light reflected by the obstacles thereto, and processing the signals reflected by the obstacles to develop three-dimensional representations of the obstacles. In some embodiments, each image capture device 628 may be embodied as, or otherwise include, a flash lidar camera that has a light source, a sensor, and a controller. Furthermore, it should be appreciated that in some embodiments, the detection system 624 may include other suitable components in addition to, or as an alternative to, the aforementioned devices, such as one or more phased array(s), microelectromechanical device(s), scanner(s), and photodetector(s), for example.

The illustrative ultrasonic detection system 630 is embodied as, or otherwise includes, any device or collection of devices capable of detecting and/or imaging, based on ultrasonic sound waves, obstacles in an agricultural field that may be encountered by the agricultural implement 102 in use thereof. The illustrative detection system 630 includes one or more signal generator(s) 632 and one or more receiver(s) 634 communicatively coupled to the controller 604. Each signal generator 632 may be embodied as, or otherwise include, any device or collection of devices capable of generating and emitting ultrasonic sound waves toward obstacles in an agricultural field. Each receiver 634 may be embodied as, or otherwise include, any device or collection of devices capable of receiving sound waves provided thereto from the obstacles and converting the sound waves into measurable electrical signals. It should be appreciated that in some embodiments, the detection system 630 may include other suitable components in addition to, or as an alternative to, the aforementioned devices, such as one or more signal processor(s), for example.

In the illustrative embodiment, the tool positioning and adjustment mechanisms 636 are embodied as, or otherwise include, devices capable of positioning and/or adjusting components of the agricultural implement 102 (e.g., the shank assemblies 132) based on electrical input provided by the controller 604 in response to sensor input provided to the controller 604 (e.g., from the sensors 302, 304, 402 or the obstacle detection systems 320, 520). In some embodiments, the mechanisms 636 may be embodied as, or otherwise include, one or more electrical actuators and/or solenoids, for example. Additionally, in some embodiments, the mechanisms 636 may be embodied as, include, or otherwise be adapted for use with, one or more linkages, racks, pinions, bars, brackets, rods, gears, pulleys, sprockets, wheels, bearings, shafts, chains, belts, axles, valves, tracks, differentials, or the like.

The dashboard 638 of the illustrative control system 602 includes a display 640 and a user interface 642. The display 640 is configured to output or display various indications, messages, and/or prompts to an operator, which may be generated by the control system 602. The user interface 642 is configured to provide various inputs to the control system 602 based on various actions, which may include actions performed by an operator.

The illustrative location system 644 includes the GPS 530 and the antennas 532, 534. The location system 644 is capable of providing a location of the tractor 400 and/or the implement 102 to the controller 604 in use of the work machine 100. As described in greater detail below with reference to FIGS. 12 and 13, with the aid of the location system 644, the controller 604 is configured to map a location of one or more obstacles present in an agricultural field to generate event data for the field.

The receiver unit 646 may be included in the control system 602 in some embodiments as indicated above. Of course, it should be appreciated that in other embodiments, the receiver unit 646 may be omitted from the control system 602. In some embodiments, the receiver unit 646 may include a light receiver 648 that is configured to receive light and/or energy originating from, or otherwise provided by, the camera detection system 610. Additionally, in some embodiments, the receiver unit 646 may include a radio wave receiver 650 that is configured to receive radar signals originating from, or otherwise provided by, the radar detection system 616. Furthermore, in some embodiments, the receiver unit 646 may include an ultrasonic sound wave receiver 652 that is configured to receive ultrasonic sound waves originating from, or otherwise provided by, the ultrasonic detection system 630. Finally, in some embodiments, the receiver unit 646 may include a laser receiver 654 that is configured to receive ultraviolet, visible, or near infrared light originating from, or otherwise provided by, the lidar detection system 624.

Figure 7:
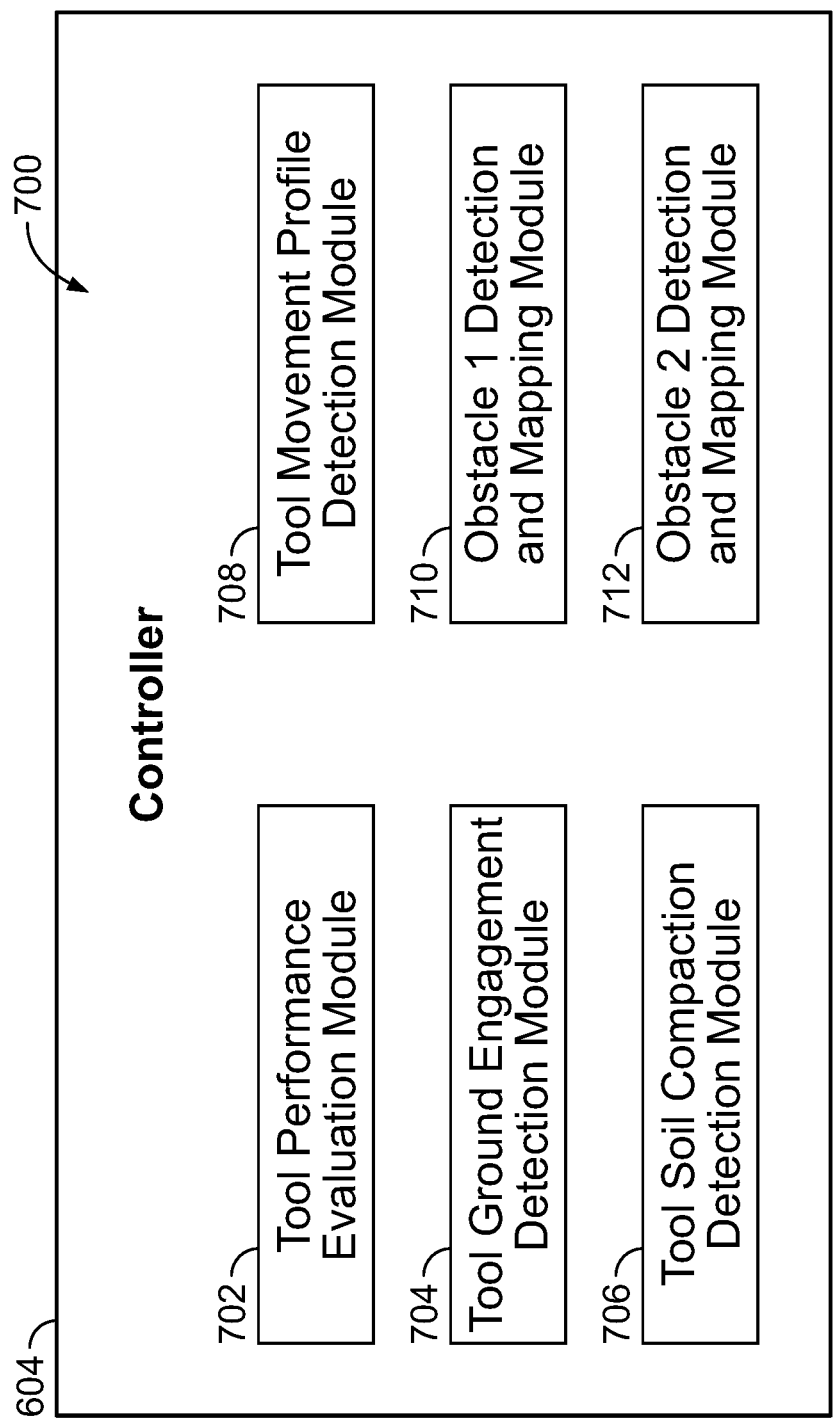
FIG. 7 is a diagrammatic view of a number of modules that may be included in a controller of the control system shown in FIG. 6.

Referring now to FIG. 7, in the illustrative embodiment, the controller 604 establishes an environment 700 during operation. The illustrative environment 700 includes a tool performance evaluation module 702, a tool ground engagement detection module 704, a tool soil compaction detection module 706, a tool movement profile detection module 708, an obstacle detection and mapping module 710, and an obstacle detection and mapping module 712. Each of the modules, logic, and other components of the environment 700 may be embodied as hardware, firmware, software, or a combination thereof. As such, in some embodiments, one or more modules of the environment 700 may be embodied as circuitry or a collection of electrical devices. In such embodiments, one or more of the tool performance evaluation module 702, the tool ground engagement detection module 704, the tool soil compaction detection module 706, the tool movement profile detection module 708, the obstacle detection and mapping module 710, and the obstacle detection and mapping module 712 may form a portion of the processor(s) 608 and/or other components of the controller 604. Additionally, in some embodiments, one or more of the illustrative modules may form a portion of another module and/or one or more of the illustrative modules may be independent of one another. Further, in some embodiments, one or more of the modules of the environment 700 may be embodied as virtualized hardware components or emulated architecture, which may be established and maintained by the processor(s) 608 or other components of the controller 604.

The tool performance evaluation module 702, which may be embodied as hardware, firmware, software, virtualized hardware, emulated architecture, and/or a combination thereof as discussed above, is configured to analyze movement of the ground engagement tools 130 relative to one another and/or to analyze movement of a particular ground engagement tool 130 with respect to its performance history based on the sensor input provided by the sensor(s) 302. To do so, in the illustrative embodiment, the tool performance evaluation module 702 may perform the method described below with reference to FIG. 8.

The tool ground engagement detection module 704, which may be embodied as hardware, firmware, software, virtualized hardware, emulated architecture, and/or a combination thereof as discussed above, is configured to determine whether a particular ground engagement tool 130 is in contact with the ground based on the sensor input provided by the sensor 302. To do so, in the illustrative embodiment, the tool ground engagement detection module 704 may perform the method described below with reference to FIG. 9.

The tool soil compaction detection module 706, which may be embodied as hardware, firmware, software, virtualized hardware, emulated architecture, and/or a combination thereof as discussed above, is configured to determine whether one or more ground engagement tools 130 are positioned in one or more soil compaction layers based on, among other things, sensor input provided by the sensors 302, 402, and in some embodiments, based on input provided by the sensors 304. To do so, in the illustrative embodiment, the tool soil compaction detection module 706 may perform the method described below with reference to FIG. 10.

The tool movement profile detection module 708, which may be embodied as hardware, firmware, software, virtualized hardware, emulated architecture, and/or a combination thereof as discussed above, is configured to determine whether movement of the ground engagement tools 130 is consistent with and/or meets reference signals based on, among other things, sensor input provided by the sensors 302. To do so, in the illustrative embodiment, the tool movement profile detection module 708 may perform the method described below with reference to FIG. 11.

The obstacle detection and mapping module 710, which may be embodied as hardware, firmware, software, virtualized hardware, emulated architecture, and/or a combination thereof as discussed above, is configured to selectively map, based on sensor input from the sensors 302 and detection input from one of the obstacle detection systems 320, 520, the location(s) of one or more obstacles present in an agricultural field. To do so, in the illustrative embodiment, the obstacle detection and mapping module 710 may perform the method described below with reference to FIG. 12.

The obstacle detection and mapping module 712, which may be embodied as hardware, firmware, software, virtualized hardware, emulated architecture, and/or a combination thereof as discussed above, is configured to selectively map, based on sensor input from the sensors 302, detection input from one of the obstacle detection systems 320, 520, and event history data associated with a particular field, the location(s) of one or more obstacles present in an agricultural field. To do so, in the illustrative embodiment, the obstacle detection and mapping module 712 may perform the method described below with reference to FIG. 13.

Figure 8:
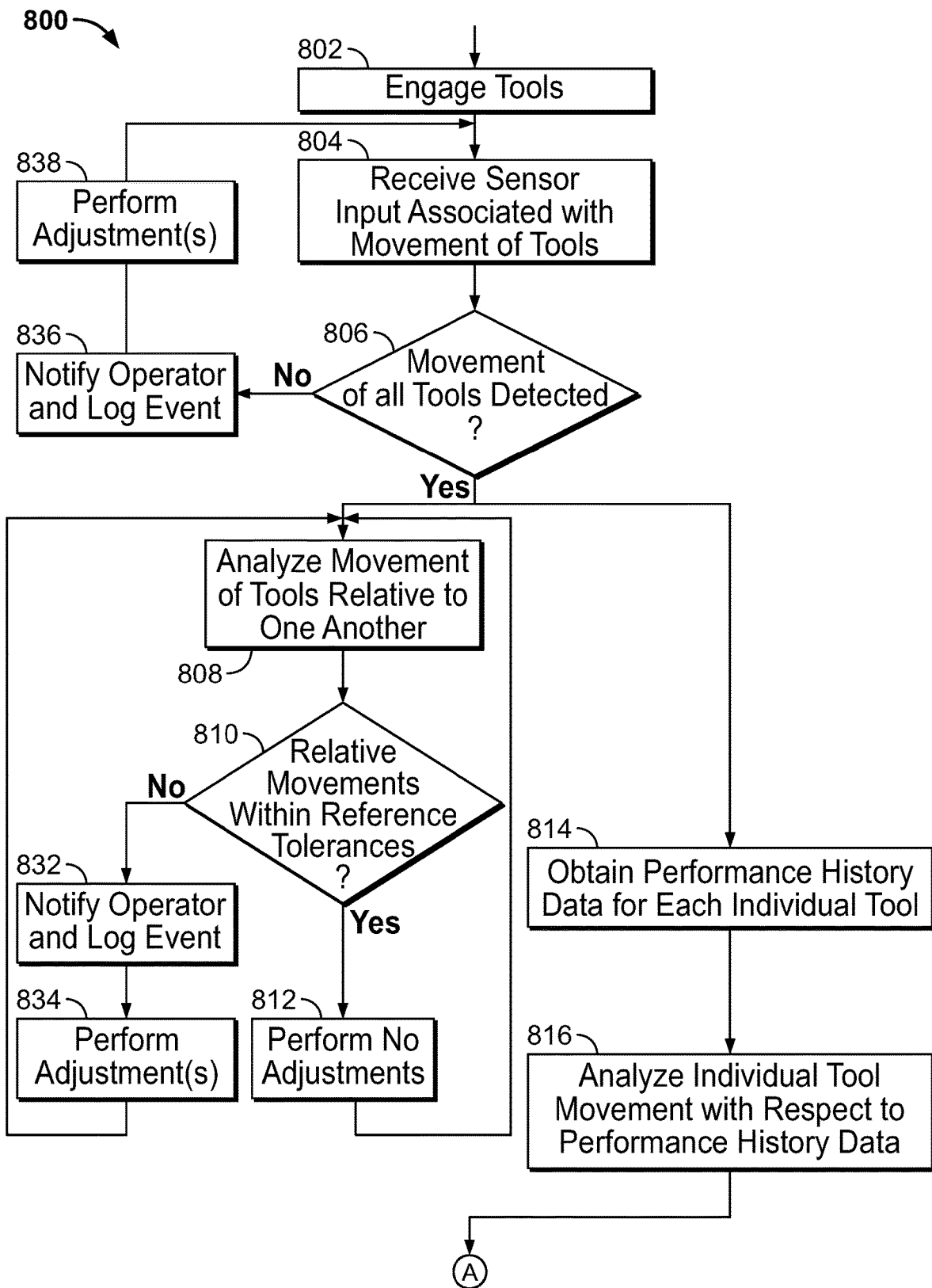
FIG. 8 is a simplified flowchart of a method that may be performed by a tool performance module of the controller diagrammatically depicted in FIG. 7.
Figure 8:
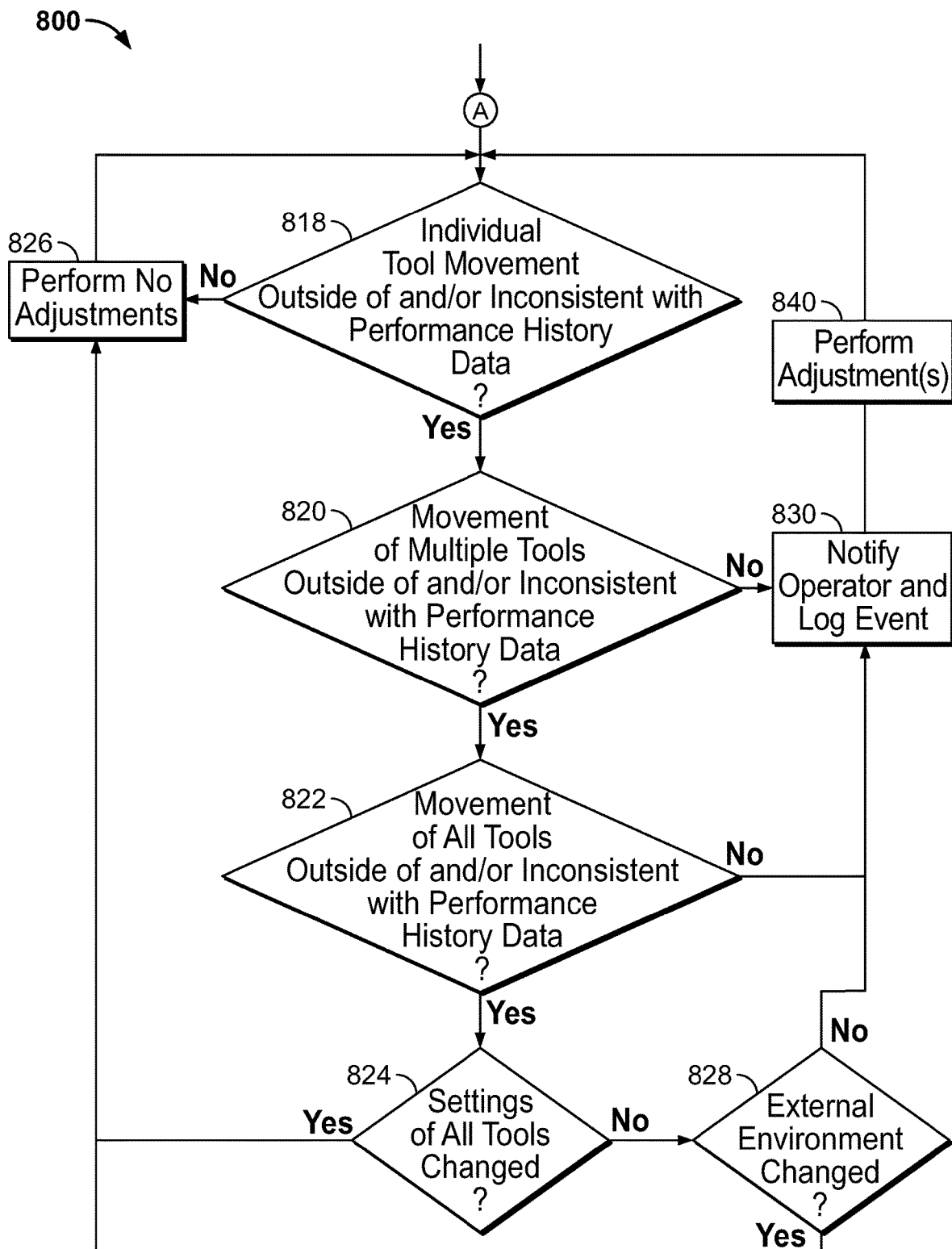

Referring now to FIG. 8, an illustrative method 800 of operating the work machine 100 may be embodied as, or otherwise include, a set of instructions that are executable by the control system 602 (i.e., the tool performance evaluation module 702 of the controller 604). The method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the controller 604 engages, or directs engagement of, the ground engagement tools 130. To do so, the controller 604 may move, or direct movement of, each of the shank assemblies 132 to the ripping position 152. From block 802, the method 800 subsequently proceeds to block 804.

In block 804 of the illustrative method 800, the controller 604 receives the sensor input provided by the movement sensors 302. From block 804, the method 800 subsequently proceeds to block 806.

In block 806 of the illustrative method 800, the controller 604 determines, based on the sensor input provided in block 804, whether movement of each of the ground engagement tools 130 is detected by the sensors 302. Put another way, in block 806, based on the sensor input provided in block 804, the controller 604 determines whether movement of all the ground engagement tools 130 is detected by the sensors 302. If the controller 604 determines in block 806 that movement of each of the tools 130 is detected by the sensors 302, the method 800 subsequently proceeds to block 808 or block 814. Of course, it should be appreciated that in response to a determination by the controller 604 in block 806 that movement of each of the tools 130 is detected by the sensors 302, blocks 808 and 814 may be performed substantially contemporaneously and/or in parallel with one another.

In block 808 of the illustrative method 800, the controller 604 analyzes, based on the sensor input provided by the sensors 302, movements of the ground engagement tools 130 relative to one another to evaluate performance uniformity of the work machine 100 across each row 432. Therefore, in block 808, the controller 604 may analyze relative movements of the tools 130 arranged in each row 432 to evaluate the health and/or performance of those tools 130. In any case, from block 808, the method 800 subsequently proceeds to block 810.

In block 810 of the illustrative method 800, the controller 604 determines whether movements of the ground engagement tools 130 relative to one another fall within one or more reference tolerances. It should be appreciated that to perform block 810, the controller 604 may compare the relative movements of the tools 130 analyzed in block 808 to the one or more reference tolerances. If the controller 604 determines in block 810 that the movements of the tools 130 relative to one another fall within the one or more reference tolerances, the method 800 subsequently proceeds to block 812.

In block 812 of the illustrative method 800, the controller 604 notifies an operator (e.g., via the dashboard 638) that no adjustments to the agricultural implement 102 (i.e., to the ground engagement tools 130) need to be performed. Following completion of block 812, the method 800 subsequently returns to block 808.

Returning to block 806, if the controller 604 determines in block 806 that movement of each of the tools 130 is detected by the sensors 302, in some embodiments, the illustrative method 800 proceeds to block 814. In block 814, the controller 604 obtains performance history data for each ground engagement tool 130. It should be appreciated that in some embodiments, performance history data for each tool 130 may be stored in a database or repository that may be accessed by the controller 604. For example, performance history data for each tool 130 may be stored in a database accessible at www.johndeere.com, or another suitable location. In any case, the performance history data for each tool 130 is indicative of characteristics of movement (e.g., sensor input from the corresponding sensor 302) for the corresponding tool 130 in one or more previous operational states. From block 814, the method 800 subsequently proceeds to block 816.

In block 816 of the illustrative method 800, the controller 604 analyzes movement of each of the ground engagement tools 130 in a current operational state based on the sensor input associated with the corresponding sensor 302 and the performance history data associated with the corresponding tool 130. It should be appreciated that to do so, the controller 604 may compare the sensor input provided by the sensor 302 for the corresponding tool 130 in the current operational state to the performance history data associated with the corresponding tool 130. From block 816, the method 800 subsequently proceeds to block 818.

In block 818 of the illustrative method 800, the controller 604 determines whether, based on the sensor input provided by the corresponding sensor 302 and the performance history data associated with the particular ground engagement tool 130, movement of the tool 130 in the current operational state is outside of, or inconsistent with, movement of the tool 130 in one or more previous operational states. If the controller 604 determines in block 818 that movement of the particular tool 130 in the current operational state is outside, or inconsistent with, movement of the tool 130 in one of more previous operational states, the method 800 subsequently proceeds to block 820.

In block 820 of the illustrative method 800, the controller 604 determines whether, based on the sensor input provided by multiple sensors 302 and the performance history data associated with multiple ground engagement tools 130, movement of multiple tools 130 in their corresponding current operational states are outside of, or inconsistent with, movements of those tools 130 in one or more previous operational states. If the controller 604 determines in block 820 that movements of multiple tools 130 in their corresponding current operational states are outside of, or inconsistent with, movements of those tools 130 in one or more previous operational states, the method 800 subsequently proceeds to block 822.

In block 822 of the illustrative method 800, the controller 604 determines whether, based on the sensor input provided by each of the sensors 302 and the performance history data associated with each of the ground engagement tools 130, movement of each of the tools 130 in its corresponding current operational state is outside of, or inconsistent with, movement of each of the tools 130 in one or more previous operational states. If the controller 604 determines in block 822 that movement of each of the tools 130 in its corresponding current operational state is outside of, or inconsistent with, movement of each of the tools 130 in one or more previous operational states, the method 800 subsequently proceeds to block 824.

In block 824 of the illustrative method 800, the controller 604 determines whether one or more settings of each of the ground engagement tools 130 has changed (e.g., due to operator action). If the controller 604 determines in block 824 that one or more settings of all the tools 130 have changed, the method 800 subsequently proceeds to block 826.

In block 826 of the illustrative method 800, the controller 604 notifies an operator (e.g., via the dashboard 638) that no adjustments to the agricultural implement 102 (i.e., to the ground engagement tools 130) need to be performed. Following completion of block 826, the method 800 subsequently returns to block 818.

Returning to block 824 of the illustrative method 800, if the controller 604 determines in block 824 that one or more settings of all the tools 130 have not changed, the method 800 proceeds to block 828. In block 828, the controller 604 determines whether the external environment has changed. The external environment may correspond to, or otherwise be associated with, characteristics of the agricultural field and/or the ambient environment. Additionally, the external environment may be characterized by, or otherwise take into account, parameters such as temperature, humidity, precipitation, visibility, pressure, wind, known locations of obstacles in the field, known trends or patterns associated with particular obstacles, and/or any other parameters of interest. It should be appreciated that settings and/or parameters characterizing the external environment may be changed by an operator via the dashboard 638, at least in some embodiments. In any case, if the controller 604 determines in block 828 that the external environment has changed, the method 800 subsequently proceeds to block 826. However, if the controller 604 determines in block 828 that the external environment has not changed, the method 800 subsequently proceeds to block 830.

In block 830 of the illustrative method 800, the controller 604 notifies an operator of an event (e.g., via the dashboard 638) determined following the performance of block 828. The event notification may indicate that (i) the movement of all tools 130 are outside of, and/or inconsistent with, the performance history data associated therewith (i.e., as determined in block 822), (ii) the settings of the tools 130 have not been changed (i.e., as determined in block 824), and (iii) the external environment has not changed (i.e., as determined in block 828). In addition, in block 830, the controller 604 generates a log or flag associated with the event, which may be displayed on the dashboard 638 and/or stored in a database accessible by the controller 604 (e.g., a database accessible at myjohndeere.com). Following completion of block 830, the method 800 subsequently returns to block 818.

Returning to block 810 of the illustrative method 800, if the controller 604 determines in block 810 that movements of the ground engagement tools 130 relative to one another are not within, or fall outside of, the reference tolerances, the method 800 subsequently proceeds to block 832. In block 832, the controller 604 notifies an operator of an event (e.g., via the dashboard 638) determined following the performance of block 810. The event notification may indicate that relative movements of the ground engagement tools 130 are not within the reference tolerances (i.e., as determined in block 810). In addition, in block 832, the controller 604 generates a log or flag associated with the event, which may be displayed on the dashboard 638 and/or stored in a database accessible by the controller 604 (e.g., a database accessible at myjohndeere.com). Following completion of block 832, at least in some embodiments, the method 800 subsequently proceeds to block 834.

In block 834 of the illustrative method 800, the controller 604 may perform an automated adjustment to the agricultural implement 102 (i.e., to the ground engagement tools 130). As depicted in FIG. 8, the illustrative method 800 includes blocks 832 and 834. It should be appreciated that in at least some embodiments, performance of the illustrative method 800 by the controller 604 may not require the performance of blocks 832 and 834. Rather, in such embodiments, block 832 or block 834 may be performed by the controller 604. In any case, in the illustrative embodiment, following completion of block 834, the method 800 subsequently returns to block 808.

Returning to block 806 of the illustrative method 800, if the controller 604 determines in block 806 that movement of each of the ground engagement tools 130 is not detected based on the sensor input provided by the sensors 302, the method 800 subsequently proceeds to block 836. In block 836, the controller 604 notifies an operator of an event (e.g., via the dashboard 638) determined following the performance of block 806. The event notification may indicate that movement of each of the tools 130 is not detected (i.e., as determined in block 806). In addition, in block 836, the controller 604 generates a log or flag associated with the event, which may be displayed on the dashboard 638 and/or stored in a database accessible by the controller 604 (e.g., a database accessible at myjohndeere.com). Following completion of block 836, at least in some embodiments, the method 800 subsequently proceeds to block 838.

In block 838 of the illustrative method 800, the controller 604 may perform an automated adjustment to the agricultural implement 102 (i.e., to the ground engagement tools 130). As depicted in FIG. 8, the illustrative method 800 includes blocks 836 and 838. It should be appreciated that in at least some embodiments, performance of the illustrative method 800 by the controller 604 may not require the performance of blocks 836 and 838. Rather, in such embodiments, block 836 or block 838 may be performed by the controller 604. In any case, in the illustrative embodiment, following completion of block 838, the method 800 subsequently returns to block 804.

Figure 9:
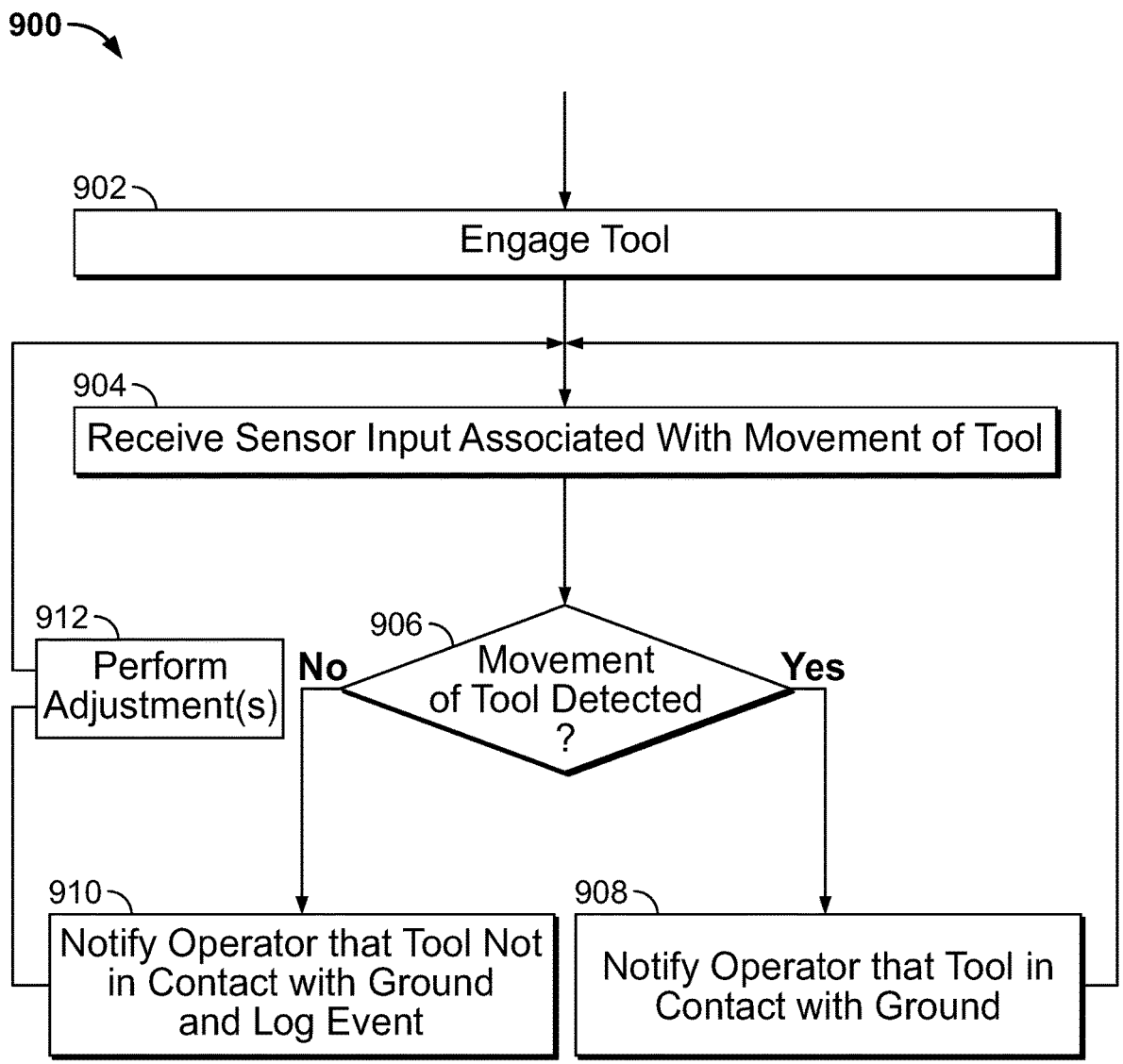
FIG. 9 is a simplified flowchart of a method that may be performed by a tool ground engagement detection module of the controller diagrammatically depicted in FIG. 7.

Referring now to FIG. 9, an illustrative method 900 of operating the work machine 100 may be embodied as, or otherwise include, a set of instructions that are executable by the control system 602 (i.e., the tool ground engagement detection module 704 of the controller 604). The method 900 corresponds to, or is otherwise associated with, performance of the blocks described below in the illustrative sequence of FIG. 9. It should be appreciated, however, that the method 900 may be performed in one or more sequences different from the illustrative sequence.

The illustrative method 900 begins with block 902. In block 902, the controller 604 engages, or directs engagement of, the ground engagement tools 130. To do so, the controller 604 may move, or direct movement of, each of the shank assemblies 132 to the ripping position 152. From block 902, the method 900 subsequently proceeds to block 904.

In block 904 of the illustrative method 900, the controller 604 receives the sensor input provided by the movement sensors 302. From block 904, the method 900 subsequently proceeds to block 906.

In block 906 of the illustrative method 900, the controller 604 determines, based on the sensor input provided in block 904, whether movement of a particular ground engagement tool 130 is detected by the corresponding sensor 302. If the controller 604 determines in block 906 that movement of the particular ground engagement tool 130 is detected by the corresponding sensor 302, the method 900 subsequently proceeds to block 908.

In block 908 of the illustrative method 900, the controller 604 notifies an operator (e.g., via the dashboard 638) that the particular tool 130 is in contact with the ground. From block 908, the method 900 subsequently returns to block 904.

Returning to block 906 of the illustrative method 900, if the controller 604 determines in block 906 that movement of the particular tool 130 is not detected, the method 900 subsequently proceeds to block 910. In block 910, the controller 604 notifies an operator of an event (e.g., via the dashboard 638) determined following the performance of block 906. The event notification may indicate that movement of the particular tool 130 is not detected (i.e., as determined in block 906). In addition, in block 910, the controller 604 generates a log or flag associated with the event, which may be displayed on the dashboard 638 and/or stored in a database accessible by the controller 604 (e.g., a database accessible at myjohndeere.com). Following completion of block 910, in at least some embodiments, the method 900 subsequently proceeds to block 912.

In block 912 of the illustrative method 900, the controller 604 may perform an automated adjustment to the agricultural implement 102 (i.e., to the ground engagement tools 130). As depicted in FIG. 9, the illustrative method 900 includes blocks 910 and 912. It should be appreciated that in at least some embodiments, performance of the illustrative method 900 by the controller 604 may not require the performance of blocks 910 and 912. Rather, in such embodiments, block 910 or block 912 may be performed by the controller 604. In any case, in the illustrative embodiment, following completion of block 912, the method 900 subsequently returns to block 904.

Figure 10:
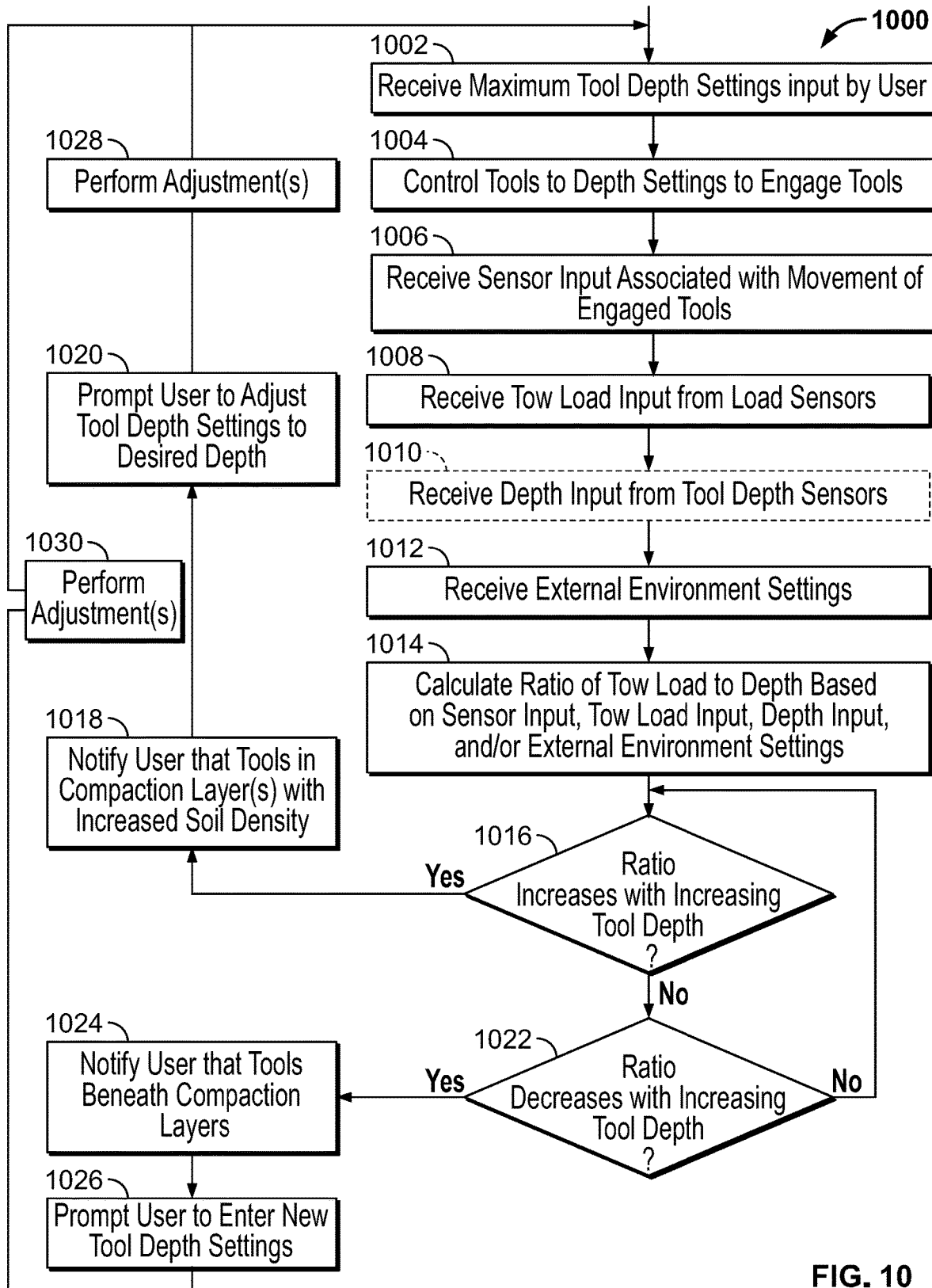
FIG. 10 is a simplified flowchart of a method that may be performed by a tool soil compaction detection module of the controller diagrammatically depicted in FIG. 7.

Referring now to FIG. 10, an illustrative method 1000 of operating the work machine 100 may be embodied as, or otherwise include, a set of instructions that are executable by the control system 602 (i.e., the tool soil compaction detection module 706 of the controller 604). The method 1000 corresponds to, or is otherwise associated with, performance of the blocks described below in the illustrative sequence of FIG. 10. It should be appreciated, however, that the method 1000 may be performed in one or more sequences different from the illustrative sequence.

The illustrative method 1000 begins with block 1002. In block 1002, the controller 604 receives one or more maximum depth settings input by an operator (e.g., via the dashboard 638) for the ground engagement tools 130. It should be appreciated that at least in some embodiments, the maximum depth settings may correspond to a maximum penetration depth of the tools 130 into the ground in use of the work machine 100. From block 1002, the method 1000 subsequently proceeds to block 1004.

In block 1004 of the illustrative method 1000, the controller 604 controls (e.g., sets and/or directs movement of) the tools 130 to the maximum depth settings input in block 1002. To do so, at least in some embodiments, the controller 604 may provide input to the tool positioning and adjustment mechanisms 636 to direct movement of the tools 130. It should be appreciated that as a result of the performance of block 1004, each of the shank assemblies 132 is controlled to the ripping position 152. From block 1004, the method 1000 subsequently proceeds to block 1006.

In block 1006 of the illustrative method 1000, the controller 604 receives the sensor input provided by the movement sensors 302 associated with the engaged (i.e., set in the ripping position 152) ground engagement tools 130. From block 1006, the method 1000 subsequently proceeds to block 1008.

In block 1008 of the illustrative method 1000, the controller 604 receives the tow load sensor input provided by the one or more load sensor(s) 402 in use of the work machine 100. From block 1008, the method 1000 subsequently proceeds to block 1010.

In block 1010 of the illustrative method 1000, the controller 604 receives the depth sensor input provided by the depth sensors 304 associated with the engaged ground engagement tools 130. Of course, as indicated above, in embodiments in which the sensors 304 are omitted from the control system 602, performance of the illustrative method 1000 by the controller 602 may not require the performance of block 1010, and block 1010 may therefore be omitted from the method 1000. In any case, from block 1010, the illustrative method 1000 subsequently proceeds to block 1012.

In block 1012 of the illustrative method 1000, the controller 604 receives one or more external environment settings input by an operator (e.g., via the dashboard 638). The one or more external environment settings may correspond to, or otherwise be associated with, characteristics of the agricultural field and/or the ambient environment. Additionally, the one or more external environment settings may be characterized by, or otherwise take into account, parameters such as temperature, humidity, precipitation, visibility, pressure, wind, known locations of obstacles in the field, known trends or patterns associated with particular obstacles, and/or any other parameters of interest. From block 1012, the method 1000 subsequently proceeds to block 1014.

In block 1014 of the illustrative method 1000, the controller 604 calculates at least one ratio of the tow load associated with the agricultural implement 102 to the position of at least one ground engagement tool 130 relative to the ground (e.g., a penetration depth of the at least one tool 130 into the ground) based on the sensor input provided in blocks 1006, 1008, 1010 and on the external environment settings input in block 1012. Of course, it should be appreciated that in block 1014, the controller 604 may calculate a ratio corresponding to each ground engagement tool 130. Additionally, in embodiments in which the sensors 304 are omitted from the control system 602, the calculation performed by the controller 604 in block 1014 may not be based on sensor input provided by the sensors 304. In any case, from block 1014, the method 1000 subsequently proceeds to block 1016.

In block 1016 of the illustrative method 1000, the controller 604 determines whether the at least one ratio calculated in block 1014 increases as the at least one ground engagement tool 130 extends farther (i.e., penetrates deeper) into the ground. If the controller 604 determines in block 1016 that the ratio increases as the at least one tool 130 extends farther into the ground, the method 1000 subsequently proceeds to block 1018.

In block 1018 of the illustrative method 1000, the controller 604 notifies an operator (e.g., via the dashboard 638) that one or more ground engagement tools 130 are located in one or more compaction layer(s) of the ground having increased soil density (i.e., relative to other non-compaction layer(s) of the ground). From block 1018, the method 1000 subsequently proceeds to block 1020.

In block 1020 of the illustrative method 1000, the controller 604 prompts an operator (e.g., via a prompt or notification displayed on the dashboard 638) to adjust the maximum depth settings of the ground engagement tools 130 to a desired depth in view of the notification performed in block 1018. Following completion of block 1020, at least in some embodiments, the method 1000 subsequently proceeds to block 1028.

In block 1028 of the illustrative method 1000, the controller 604 may perform an automated adjustment to the agricultural implement 102 (i.e., to the ground engagement tools 130). As depicted in FIG. 10, the illustrative method 1000 includes blocks 1020 and 1028. It should be appreciated that in at least some embodiments, performance of the illustrative method 1000 by the controller 604 may not require the performance of blocks 1020 and 1028. Rather, in such embodiments, block 1020 or block 1028 may be performed by the controller 604. In any case, in the illustrative embodiment, following completion of block 1028, the method 1000 subsequently returns to block 1002.

Returning to block 1016 of the illustrative method 1000, if the controller 604 determines in block 1016 that the at least one ratio calculated in block 1014 does not increase as the at least one ground engagement tool 130 extends farther into the ground, the method 1000 subsequently proceeds to block 1022. In block 1022, the controller 604 determines whether the at least one ratio calculated in block 1014 decreases as the at least one tool 130 extends farther into the ground. If the controller 604 determines in block 1022 that the at least one ratio calculated in block 1014 decreases as the at least one tool 130 extends farther into the ground, the method 1000 subsequently proceeds to block 1024.

In block 1024 of the illustrative method 1000, the controller 604 notifies an operator (e.g., via the dashboard 638) that one or more ground engagement tools 130 are located beneath one or more compaction layers of the ground. From block 1024, the method 1000 subsequently proceeds to block 1026.

In block 1026 of the illustrative method 1000, the controller 604 prompts an operator (e.g., via a prompt or notification displayed on the dashboard 638) to enter new settings for the maximum depth of the ground engagement tools 130. Following completion of block 1026, in at least some embodiments, the method 1000 subsequently proceeds to block 1030.

In block 1030 of the illustrative method 1000, the controller 604 may perform an automated adjustment to the agricultural implement 102 (i.e., to the ground engagement tools 130). As depicted in FIG. 10, the illustrative method 1000 includes blocks 1026 and 1030. It should be appreciated that in at least some embodiments, performance of the illustrative method 1000 by the controller 604 may not require the performance of blocks 1026 and 1030. Rather, in such embodiments, block 1026 or block 1030 may be performed by the controller 604. In any case, in the illustrative embodiment, following completion of block 1030, the method 1000 subsequently returns to block 1002.

Returning to block 1022 of the illustrative method 1000, if the controller 604 determines in block 1022 that the at least one ratio calculated in block 1014 does not decrease as the at least one ground engagement tool 130 extends farther into the ground, the method 1000 subsequently returns to block 1016.

Figure 11:
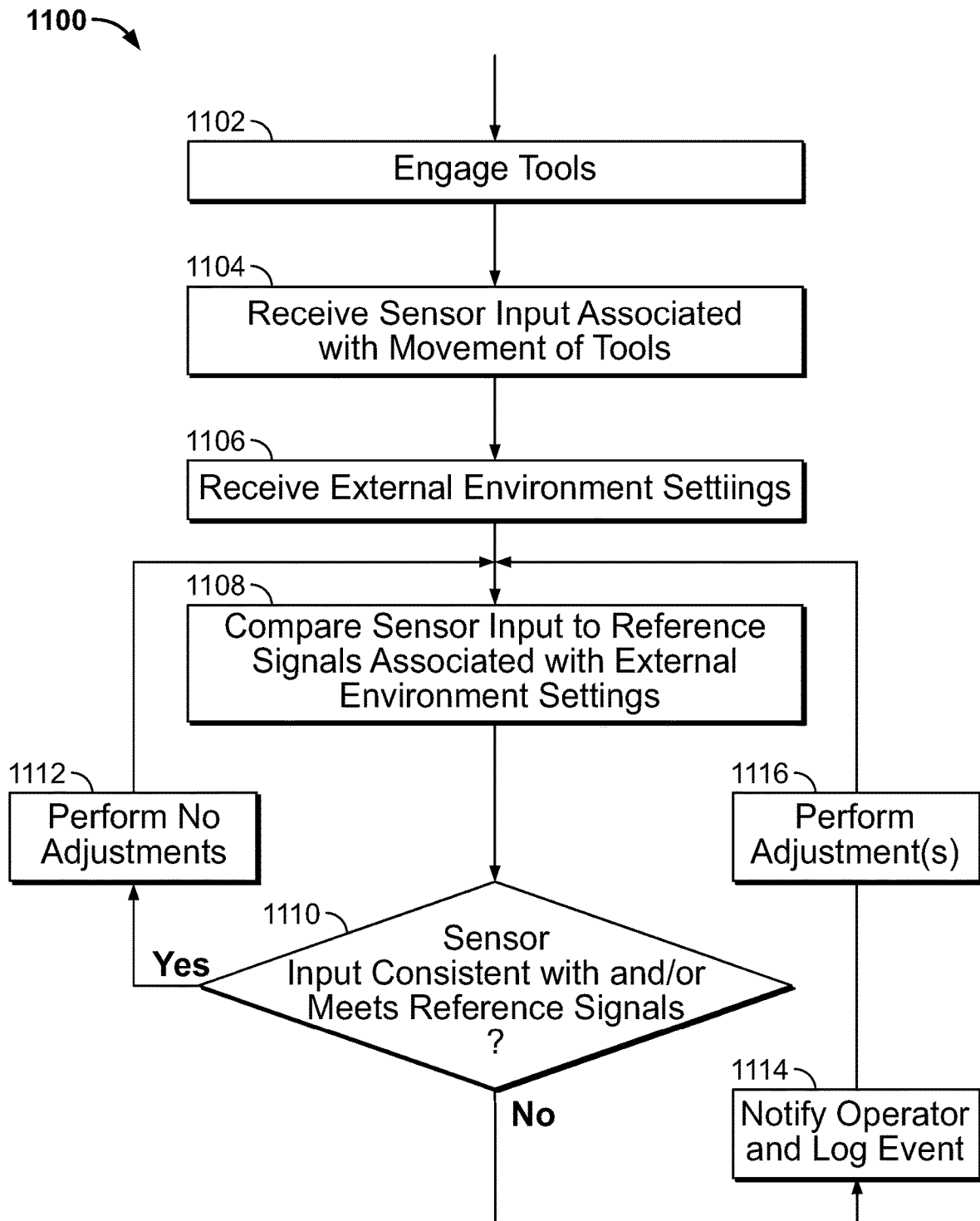
FIG. 11 is a simplified flowchart of a method that may be performed by a tool movement profile detection module of the controller diagrammatically depicted in FIG. 7.

Referring now to FIG. 11, an illustrative method 1100 of operating the work machine 100 may be embodied as, or otherwise include, a set of instructions that are executable by the control system 602 (i.e., the tool movement profile detection module 708 of the controller 604). The method 1100 corresponds to, or is otherwise associated with, performance of the blocks described below in the illustrative sequence of FIG. 11. It should be appreciated, however, that the method 1100 may be performed in one or more sequences different from the illustrative sequence.

The illustrative method 1100 begins with block 1102. In block 1102, the controller 604 engages, or directs engagement of, the ground engagement tools 130. To do so, the controller 604 may move, or direct movement of, each of the shank assemblies 132 to the ripping position 152. From block 1102, the method 1100 subsequently proceeds to block 1104.

In block 1104 of the illustrative method 1100, the controller 604 receives the sensor input provided by the movement sensors 302 associated with the engaged (i.e., set in the ripping position 152) ground engagement tools 130. From block 1104, the method 1100 subsequently proceeds to block 1106.

In block 1106 of the illustrative method 1100, the controller 604 receives one or more external environment settings input by an operator (e.g., via the dashboard 638). The one or more external environment settings may correspond to, or otherwise be associated with, characteristics of the agricultural field and/or the ambient environment. Additionally, the one or more external environment settings may be characterized by, or otherwise take into account, parameters such as temperature, humidity, precipitation, visibility, pressure, wind, known locations of obstacles in the field, known trends or patterns associated with particular obstacles, and/or any other parameters of interest. From block 1106, the method 1100 subsequently proceeds to block 1108.

In block 1108 of the illustrative method 1100, the controller 604 compares the sensor input provided by the sensors 302 associated with the ground engagement tools 130 to reference signals associated with the external environment settings input by the operator in block 1106. From block 1108, the method 1100 subsequently proceeds to block 1110.

In block 1110 of the illustrative method 1100, the controller 604 determines whether the sensor input provided by the sensors 302 is consistent with, and/or meets, the reference signals associated with the external environment settings input in block 1106. It should be appreciated that, at least in some embodiments, the controller 604 may perform block 1110 to evaluate performance of the agricultural implement 102 in certain operational states, which may correspond to, or otherwise be associated with, the external environment settings input in block 1106. In any case, if the controller 604 determines in block 1110 that the sensor input provided by the sensors 302 is consistent with, and/or meets, the reference signals associated with the external environment settings, the method 1100 subsequently proceeds to block 1112.

In block 1112 of the illustrative method 1100, the controller 604 notifies an operator (e.g., via the dashboard 638) that no adjustments to the agricultural implement 102 (i.e., to the ground engagement tools 130) need to be performed. Following completion of block 1112, the method 1100 subsequently returns to block 1108.

Returning to block 1110 of the illustrative method 1100, if the controller 604 determines in block 1110 that the sensor input provided by the sensors 302 is not consistent with, and/or meets, the reference signals associated with the external environment settings, the method 1100 subsequently proceeds to block 1114. In block 114, the controller 604 notifies an operator of an event (e.g., via the dashboard 638) determined following the performance of block 1100. The event notification may indicate that the sensor input associated with one or more ground engagement tools 132 is inconsistent with, does not meet, or falls outside of, the reference signals associated with the external environment settings input by the operator in block 1106 (i.e., as determined in block 1110). In addition, in block 1114, the controller 604 generates a log or flag associated with the event, which may be displayed on the dashboard 638 and/or stored in a database accessible by the controller 604 (e.g., a database accessible at myjohndeere.com). Following completion of block 1114, in at least some embodiments, the method 1100 subsequently proceeds to block 1116.

In block 1116 of the illustrative method 1100, the controller 604 may perform an automated adjustment to the agricultural implement 102 (i.e., to the ground engagement tools 130). As depicted in FIG. 11, the illustrative method 1100 includes blocks 1114 and 1116. It should be appreciated that in at least some embodiments, performance of the illustrative method 1100 by the controller 604 may not require the performance of blocks 1114 and 1116. Rather, in such embodiments, block 1114 or block 1116 may be performed by the controller 604. In any case, in the illustrative embodiment, following completion of block 1116, the method 1100 subsequently returns to block 1108.

Figure 12:
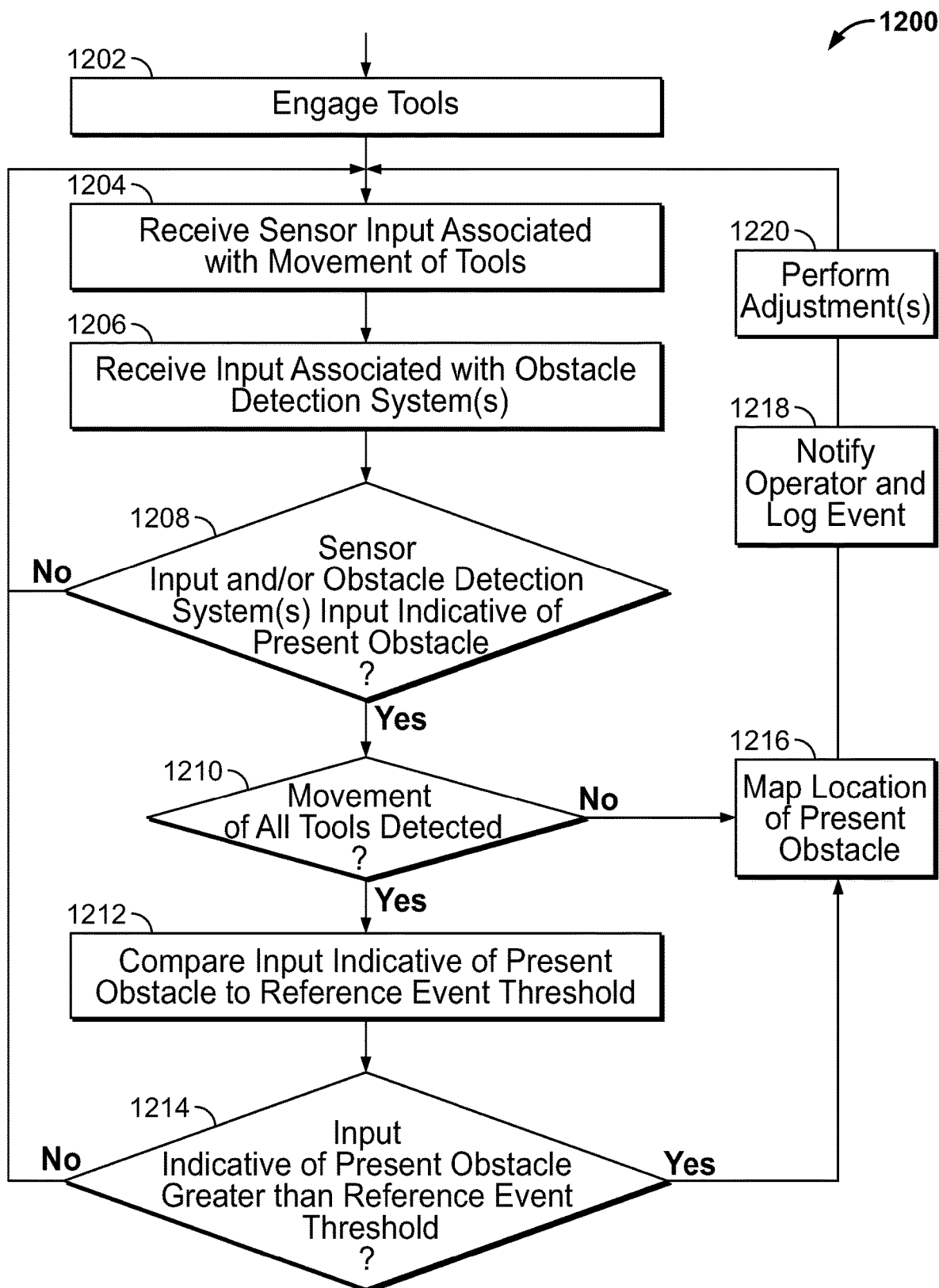
FIG. 12 is a simplified flowchart of a method that may be performed by one obstacle detection and mapping module of the controller diagrammatically depicted in FIG. 7.

Referring now to FIG. 12, an illustrative method 1200 of operating the work machine 100 may be embodied as, or otherwise include, a set of instructions that are executable by the control system 602 (i.e., the obstacle detection and mapping module 710 of the controller 604). The method 1200 corresponds to, or is otherwise associated with, performance of the blocks described below in the illustrative sequence of FIG. 12. It should be appreciated, however, that the method 1200 may be performed in one or more sequences different from the illustrative sequence.

The illustrative method 1200 begins with block 1202. In block 1202, the controller 604 engages, or directs engagement of, the ground engagement tools 130. To do so, the controller 604 may move, or direct movement of, each of the shank assemblies 132 to the ripping position 152. From block 1202, the method 1200 subsequently proceeds to block 1204.

In block 1204 of the illustrative method 1200, the controller 604 receives the sensor input provided by the movement sensors 302 associated with the engaged (i.e., set in the ripping position 152) ground engagement tools 130. From block 1204, the method 1200 subsequently proceeds to block 1206.

In block 1206 of the illustrative method 1200, the controller 604 receives the detection input associated with one or more of the obstacle detection systems 320, 520. Of course, it should be appreciated that in block 1206, the controller 604 may receive detection input provided by any one or more of the camera detection system 610, the radar detection system 616, the LIDAR detection system 624, and the ultrasonic detection system 630. Regardless, from block 1206, the method 1200 subsequently proceeds to block 1208.

In block 1208 of the illustrative method 1200, the controller 604 determines whether the input provided by the sensors 302 in block 1204 and/or the detection input provided by one or more of the detection systems 320, 520 in block 1206 is indicative of one or more obstacles present in the field. If the controller 604 determines in block 1208 that the input provided in block 1204 and/or block 1206 is indicative of one or more present obstacles such that one or more obstacles are identified in the field, the method 1200 subsequently proceeds to block 1210.

In block 1210 of the illustrative method 1200, the controller 604 determines, based on the sensor input provided in block 1204, whether movement of each of the ground engagement tools 130 is detected by the sensors 302. Put another way, in block 1210, based on the sensor input provided in block 1204, the controller 604 determines whether movement of all the ground engagement tools 130 is detected by the sensors 302. If the controller 604 determines in block 1210 that movement of each of the tools 130 is detected by the sensors 302, the method 1200 subsequently proceeds to block 1212.

In block 1212 of the illustrative method 1200, the controller 604 compares the input indicative of the one or more present obstacles (i.e., the input provided by the sensors 302 and/or the obstacle detection systems 320, 520) to a reference event threshold. It should be appreciated that the reference event threshold may correspond to, or otherwise be associated with, a value, a range, or a tolerance. Furthermore, it should be appreciated that input greater than, or otherwise outside of, the reference event threshold may correspond to an operational event and/or fault. From block 1212, the method 1200 subsequently proceeds to block 1214.

In block 1214 of the illustrative method 1200, the controller 604 determines whether the input indicative of the one or more present obstacles is greater than the reference event threshold. If the controller 604 determines in block 1214 that the input is greater than the reference event threshold, the method 1200 subsequently proceeds to block 1216.

In block 1216 of the illustrative method 1200, the controller 604 maps the location of the one or more present obstacles with the aid of the location system 644. It should be appreciated that the location(s) mapped by the controller 604 in block 1216 may be used to generate event data for the field in which the work machine 100 is employed. Furthermore, it should be appreciated that event data generated for a particular field may be displayed on the dashboard 638 and/or stored in a database accessible by the controller 604 (e.g., a database accessible at myjohndeere.com). Following completion of block 1216, the method 1200 subsequently proceeds to block 1218.

In block 1218 of the illustrative method 1200, the controller 604 notifies an operator of an event (e.g., via the dashboard 638) determined following the performance of block 1216. The event notification may indicate that the location of one or more present obstacles have been determined and mapped. In addition, in block 1216, the controller 604 generates a log or flag associated with the event, which may be displayed on the dashboard 638 and/or stored in a database accessible by the controller 604 (e.g., a database accessible at myjohndeere.com). Following completion of block 1218, in at least some embodiments, the method 1200 subsequently proceeds to block 1220.

In block 1220 of the illustrative method 1200, the controller 604 may perform an automated adjustment to the agricultural implement 102 (i.e., to the ground engagement tools 130). As depicted in FIG. 12, the illustrative method 1200 includes blocks 1218 and 1220. It should be appreciated that in at least some embodiments, performance of the illustrative method 1200 by the controller 604 may not require the performance of blocks 1218 and 1220. Rather, in such embodiments, block 1218 or block 1220 may be performed by the controller 604. In any case, in the illustrative embodiment, following completion of block 1220, the method 1200 subsequently returns to block 1204.

Returning to block 1214 of the illustrative method 1200, if the controller 604 determines in block 1214 that the input indicative of the one or more present obstacles is not greater than the reference event threshold, the method 1200 subsequently returns to block 1204.

Returning to block 1210 of the illustrative method 1200, if the controller 604 determines in block 1210 that movement of each of the tools 130 is not detected by the sensors 302 such that a lack of movement of at least one of the tools 130 is determined by the controller 604 in block 1210, the method 1200 subsequently proceeds to block 1216.

Returning to block 1208 of the illustrative method 1200, if the controller 604 determines in block 1208 that the input provided in block 1204 and/or block 1206 is not indicative of one or more obstacles present in the field, the method 1200 subsequently returns to block 1204.

Figure 13:
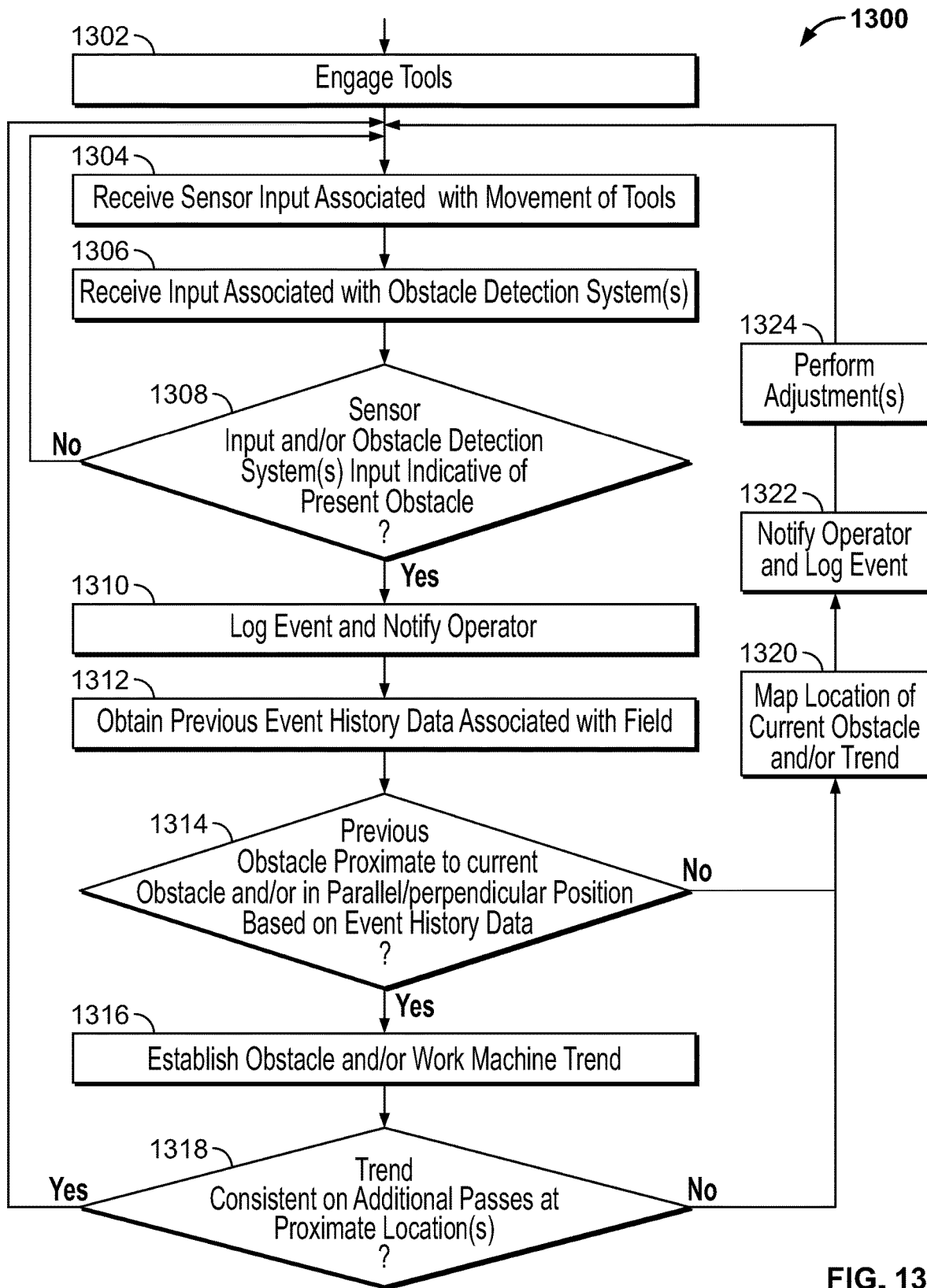
FIG. 13 is a simplified flowchart of a method that may be performed by another obstacle detection and mapping module of the controller diagrammatically depicted in FIG. 7.

Referring now to FIG. 13, an illustrative method 1300 of operating the work machine 100 may be embodied as, or otherwise include, a set of instructions that are executable by the control system 602 (i.e., the obstacle detection and mapping module 712 of the controller 604). The method 1300 corresponds to, or is otherwise associated with, performance of the blocks described below in the illustrative sequence of FIG. 13. It should be appreciated, however, that the method 1300 may be performed in one or more sequences different from the illustrative sequence.

The illustrative method 1300 begins with block 1302. In block 1302, the controller 604 engages, or directs engagement of, the ground engagement tools 130. To do so, the controller 604 may move, or direct movement of, each of the shank assemblies 132 to the ripping position 152. From block 1302, the method 1300 subsequently proceeds to block 1304.

In block 1304 of the illustrative method 1300, the controller 604 receives the sensor input provided by the movement sensors 302 associated with the engaged (i.e., set in the ripping position 152) ground engagement tools 130. From block 1304, the method 1300 subsequently proceeds to block 1306.

In block 1306 of the illustrative method 1300, the controller 604 receives the detection input associated with one or more of the obstacle detection systems 320, 520. Of course, it should be appreciated that in block 1306, the controller 604 may receive detection input provided by any one or more of the camera detection system 610, the radar detection system 616, the lidar detection system 624, and the ultrasonic detection system 630. Regardless, from block 1306, the method 1300 subsequently proceeds to block 1308.

In block 1308 of the illustrative method 1300, the controller 604 determines whether the input provided by the sensors 302 in block 1304 and/or the detection input provided by one or more of the detection systems 320, 520 in block 1306 is indicative of one or more obstacles present in the field. If the controller 604 determines in block 1308 that the input provided in block 1304 and/or block 1306 is indicative of one or more present obstacles such that one or more obstacles are identified in the field, the method 1300 subsequently proceeds to block 1310.

In block 1310 of the illustrative method 1300, the controller 604 notifies an operator of an event (e.g., via the dashboard 638) determined following the performance of block 1308. The event notification may indicate that one or more obstacles have been identified in the field (i.e., as determined in block 1308). In addition, in block 1310, the controller 604 generates a log or flag associated with the event, which may be displayed on the dashboard 638 and/or stored in a database accessible by the controller 604 (e.g., a database accessible at myjohndeere.com). From block 1310, the method 1300 subsequently proceeds to block 1312.

In block 1312 of the illustrative method 1300, the controller 604 obtains event history data for the particular field that is indicative of one or more obstacles previously present in the field. It should be appreciated that in some embodiments, event history data for a particular field may be stored in a database or repository that may be accessed by the controller 604. For example, event history data for a particular field may be stored in a database accessible at myjohndeere.com, or another suitable location. In any case, from block 1312, the method 1300 subsequently proceeds to block 1314.

In block 1314 of the illustrative method 1300, the controller 604 determines whether the position(s) and/or location(s) of the one or more current obstacles associated with the sensor input provided in block 1304 and the detection input provided in block 1306 are proximate to the position(s) and/or location(s) of one or more obstacles associated with the event history data obtained in block 1312. In some embodiments, in block 1314, the controller 604 may determine whether the position(s) and/or location(s) of the one or more current obstacles associated with the sensor input provided in block 1304 and the detection input provided in block 1306 are parallel, or perpendicular, to the position(s) and/or location(s) of one or more obstacles associated with the event history data obtained in block 1312. If the controller 604 determines in block 1314 that the one or more current obstacle(s) are positioned proximate one or more obstacles associated with the event history data, the method 1300 subsequently proceeds to block 1316.

In block 1316 of the illustrative method 1300, the controller 604 establishes an obstacle and/or work machine trend for the particular field based on the position of the one or more obstacles associated with the sensor input provided in block 1304 and the detection input provided in block 1306, and based on the position of the one or more obstacles associated with the event history data obtained in block 1312. It should be appreciated that the trend established by the controller 604 in block 1316 may be stored in a database or repository that may accessed by the controller 604 during subsequent use of the work machine 100. From block 1316, the method 1300 subsequently proceeds to block 1318.

In block 1318 of the illustrative method 1300, the controller 604 determines whether the trend established in block 1316 is consistent (i.e., whether obstacles associated with that trend are repeatedly identified) upon additional passes when the work machine 100 is positioned proximate to the locations associated with the established trend. If the controller 604 determines in block 1318 that the trend established in block 1316 is consistent upon additional passes, the method 1300 subsequently returns to block 1304.

If the controller 604 determines in block 1318 that the trend established in block 1316 is not consistent upon additional passes, the method 1300 subsequently proceeds to block 1320. In block 1320, the controller 604 maps the location of the one or more current obstacles with the aid of the location system 644. It should be appreciated that the location(s) mapped by the controller 604 in block 1320 may be used to generate event data for the field in which the work machine 100 is employed. Furthermore, it should be appreciated that event data generated for a particular field may be displayed on the dashboard 638 and/or stored in a database accessible by the controller 604 (e.g., a database accessible at myjohndeere.com). In any case, from block 1320, the method 1300 subsequently proceeds to block 1322.

In block 1322 of the illustrative method 1300, the controller 604 notifies an operator of an event (e.g., via the dashboard 638) determined following the performance of block 1320. The event notification may indicate that one or more obstacles and/or obstacle trends have been mapped (i.e., as performed in block 1320). In addition, in block 1322, the controller 604 generates a log or flag associated with the event, which may be displayed on the dashboard 638 and/or stored in a database accessible by the controller 604 (e.g., a database accessible at myjohndeere.com). From block 1322, in at least some embodiments, the method 1300 subsequently proceeds to block 1324.

In block 1324 of the illustrative method 1300, the controller 604 may perform an automated adjustment to the agricultural implement 102 (i.e., to the ground engagement tools 130). As depicted in FIG. 13, the illustrative method 1300 includes blocks 1322 and 1324. It should be appreciated that in at least some embodiments, performance of the illustrative method 1300 by the controller 604 may not require the performance of blocks 1322 and 1324. Rather, in such embodiments, block 1322 or block 1324 may be performed by the controller 604. In any case, in the illustrative embodiment, following completion of block 1324, the method 1300 subsequently returns to block 1304.

Returning to block 1314 of the illustrative method 1300, if the controller 604 determines in block 1314 that the one or more current obstacle(s) are not positioned proximate one or more obstacles associated with the event history data, the method 1300 subsequently proceeds to block 1320.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A work machine comprising:
a frame structure;
a work implement coupled to the frame structure that includes a plurality of ground engagement tools each configured for movement in response to interaction with an underlying surface in use of the work machine; and
a control system coupled to the frame structure that includes a plurality of movement sensors each mounted to a corresponding one of the plurality of ground engagement tools and each configured to provide sensor input indicative of a characteristic of movement of the corresponding ground engagement tool in use of the work machine, a controller communicatively coupled to each of the plurality of movement sensors, and at least one load sensor communicatively coupled to the controller and configured to provide load sensor input indicative of a tow load associated with the work implement in use of the work machine,
wherein:
the controller includes memory having instructions stored therein that are executable by a processor to cause the processor to receive the sensor input from the plurality of movement sensors and to determine that the plurality of ground engagement tools is in contact with the ground in response to receipt of the sensor input provided by the plurality of movement sensors, and
the instructions stored in the memory are executable by the processor to cause the processor to receive the sensor input from the plurality of movement sensors and the load sensor input from the at least one load sensor, to receive one or more external environment settings input by a user, and to calculate at least one ratio of the tow load associated with the work implement to the position of at least one ground engagement tool relative to the underlying surface based at least partially on the sensor input from the plurality of movement sensors, on the load sensor input from the at least one load sensor, and on the one or more external environment settings.

2. The work machine of claim 1, wherein the instructions stored in the memory are executable by the processor to cause the processor to obtain performance history data for the plurality of ground engagement tools indicative of characteristics of movement of the plurality of ground engagement tools in one or more previous operational states and to analyze movement of the plurality of ground engagement tools in current operational states based on the sensor input and the performance history data.

3. The work machine of claim 2, wherein the instructions stored in the memory are executable by the processor to cause the processor to determine whether, based on the sensor input and the performance history data, movement of the plurality of ground engagement tools in the current operational states is outside of, or inconsistent with, movement of the plurality of ground engagement tools in the one or more previous operational states.

4. The work machine of claim 1, wherein the instructions stored in the memory are executable by the processor to cause the processor to receive the sensor input from the plurality of movement sensors, to detect movement of each of the plurality of ground engagement tools based on the sensor input, and to analyze movements of the plurality of ground engagement tools relative to one another in response to detection of movement of each of the plurality of ground engagement tools to evaluate performance uniformity of the work implement.

5. The work machine of claim 4, wherein the instructions stored in the memory are executable by the processor to cause the processor to determine whether movements of the plurality of ground engagement tools relative to one another fall within one or more reference tolerances and to prompt a user to perform one or more adjustments to the work implement via the control system in response to a determination that the movements of the plurality of ground engagement tools relative to one another fall outside the one or more reference tolerances.

6. The work machine of claim 1, wherein the instructions stored in the memory are executable by the processor to cause the processor to compare the sensor input provided by the plurality of movement sensors to one or more reference signals associated with the one or more external environment settings, and to determine whether the sensor input is consistent with, or meets, the one or more reference signals to evaluate performance of the work implement in certain operational states.

7. The work machine of claim 1, wherein the instructions stored in the memory are executable by the processor to cause the processor to determine whether the calculated at least one ratio increases as the at least one ground engagement tool extends farther into the ground and to notify a user that one or more of the plurality of ground engagement tools are located in one or more compaction layers of the ground in response to a determination that the at least one ratio increases as the at least one ground engagement tool extends farther into the ground.

8. The work machine of claim 1, wherein the instructions stored in the memory are executable by the processor to cause the processor to determine whether the calculated at least one ratio decreases as the at least one ground engagement tool extends farther into the ground and to notify a user that one or more of the plurality of ground engagement tools are located beneath one or more compaction layers of the ground in response to a determination that the at least one ratio decreases as the at least one ground engagement tool extends farther into the ground.

9. A control system mounted on a work machine including a frame structure and a work implement coupled to the frame structure that has a plurality of ground engagement tools each configured for movement in response to interaction with an underlying surface in use of the work machine, the control system comprising:
a plurality of movement sensors each mounted on a corresponding one of the plurality of ground engagement tools, wherein each of the plurality of movement sensors is configured to provide sensor input indicative of a characteristic of movement of a corresponding ground engagement tool in use of the work machine;
at least one load sensor configured to provide load sensor input indicative of a tow load associated with the work implement in use of the work machine; and
a controller communicatively coupled to each of the plurality of movement sensors and the at least one load sensor, wherein the controller includes memory having instructions stored therein that are executable by a processor to cause the processor to receive the sensor input from the plurality of movement sensors and to determine that the plurality of ground engagement tools is in contact with the ground in response to receipt of sensor input provided by the plurality of sensors that is indicative of characteristics of movement of the plurality of ground engagement tools in use of the work machine,
wherein the instructions stored in the memory are executable by the processor to cause the processor to receive the sensor input from the plurality of movement sensors and the load sensor input from the at least one load sensor, to receive one or more external environment settings input by a user, and to calculate at least one ratio of the tow load associated with the work implement to the position of at least one ground engagement tool relative to the underlying surface based at least partially on the sensor input from the plurality of movement sensors, on the load sensor input from the at least one load sensor, and on the one or more external environment settings.

10. The control system of claim 9, wherein the instructions stored in the memory are executable by the processor to cause the processor to receive the sensor input from the plurality of movement sensors, to detect movement of each of the plurality of ground engagement tools based on the sensor input, and to analyze movements of the plurality of ground engagement tools relative to one another in response to detection of movement of each of the plurality of ground engagement tools to evaluate performance uniformity of the work implement.

11. The control system of claim 10, wherein the instructions stored in the memory are executable by the processor to cause the processor to obtain performance history data for each of the plurality of ground engagement tools that is indicative of characteristics of movement for the corresponding ground engagement tool in one or more previous operational states and to analyze movement of each of the plurality of ground engagement tools in a current operational state based on the sensor input and the performance history data.

12. The control system of claim 9, wherein the instructions stored in the memory are executable by the processor to cause the processor to compare the sensor input provided by the plurality of movement sensors to one or more reference signals associated with the one or more external environment settings, and to determine whether the sensor input is consistent with, or meets, the one or more reference signals to evaluate performance of the work implement in certain operational states.

13. A method of operating a work machine including a frame structure and a work implement coupled to the frame structure that has a plurality of ground engagement tools each configured for movement in response to interaction with an underlying surface in use of the work machine, the method comprising:
receiving, by a controller of the work machine, sensor input provided by a plurality of movement sensors each mounted on a corresponding one of the plurality of ground engagement tools that is indicative of a characteristic of movement of a corresponding ground engagement tool in use of the work machine;

receiving, by the controller, load sensor input provided by at least one load sensor that is indicative of a tow load associated with the work implement in use of the work machine;

determining, by the controller, that the plurality of ground engagement tools is in contact with the ground in response to receipt of the sensor input provided by the plurality of movement sensors that is indicative of characteristics of movement of the plurality of ground engagement tools in use of the work machine;

receiving, by the controller, one or more external environment settings input by a user; and calculating, by the controller, at least one ratio of the tow load associated with the work implement to the position of at least one ground engagement tool relative to the underlying surface based at least partially on the sensor input from the plurality of movement sensors and the load sensor input from the at least one load sensor and on the one or more external environment settings.

14. The method of claim 13, further comprising:

detecting, by the controller, movement of each of the plurality of ground engagement tools based on the sensor input;

analyzing, by the controller, movements of the plurality of ground engagement tools relative to one another in response to detection of movement of each of the plurality of ground engagement tools to evaluate performance uniformity of the work implement;

obtaining, by the controller, performance history data for each of the plurality of ground engagement tools that is indicative of characteristics of movement for the corresponding ground engagement tool in one or more previous operational states; and analyzing, by the controller, movement of each of the plurality of ground engagement tools in a current operational state based on the sensor input and the performance history data.

15. The method of claim 13, further comprising:

comparing, by the controller, the sensor input provided by the plurality of movement sensors to one or more reference signals associated with the one or more external environment settings; and determining, by the controller, whether the sensor input is consistent with, or meets, the one or more reference signals to evaluate performance of the work implement in certain operational states.

\* \* \* \* \*